(12) United States Patent
Schatzl et al.

(10) Patent No.: US 8,335,806 B2
(45) Date of Patent: Dec. 18, 2012

(54) MARKING ALGORITHM FOR GARBAGE COLLECTION USING A RESCAN MAP

(75) Inventors: Thomas Schatzl, Linz (AT); Laurent Phillipe Daynes, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 217 days.

(21) Appl. No.: 12/698,013

(22) Filed: Feb. 1, 2010

(65) Prior Publication Data

US 2011/0191393 A1 Aug. 4, 2011

(51) Int. Cl.
*G06F 12/00* (2006.01)
(52) U.S. Cl. ........................................ 707/813
(58) Field of Classification Search .................. 707/813
See application file for complete search history.

(56) References Cited

U.S. PATENT DOCUMENTS

| | | | |
|---|---|---|---|
| 7,873,943 B2* | 1/2011 | Wu et al. | 717/114 |
| 2001/0023478 A1* | 9/2001 | Ozawa et al. | 711/170 |
| 2002/0078002 A1* | 6/2002 | Bottomley et al. | 707/1 |
| 2009/0063595 A1* | 3/2009 | Stoodley | 707/206 |
| 2009/0265402 A1* | 10/2009 | Dussud et al. | 707/206 |
| 2009/0300085 A1 | 12/2009 | Stephens et al. | |

FOREIGN PATENT DOCUMENTS

WO 9919802 A2 4/1999

OTHER PUBLICATIONS

International Business Machines Corporation: "A Method for Treating Mark Stack Overflow Through Card Dirtying in Concurrent Garbage Collectors;" Research Disclosure, Mason Publications, Hampshire, GB, vol. 463, No. 212, Nov. 1, 2002, XP007131723 ISSN: 0374-4353, 2 pages.
European Search Report issued in Application No. 09291000.9, dated Aug. 6, 2010, 7 pages.
Blackburn, S. M. et al.; "Immix: A Mark-Region Garbage Collector with Space Efficiency, Fast Collection, and Mutator Performance;" PLDI '08, Tucson, Arizona, Jun. 7-13, 2008, 11 pages.

* cited by examiner

*Primary Examiner* — Hung Q Pham
(74) *Attorney, Agent, or Firm* — Osha Liang LLP

(57) ABSTRACT

A method for garbage collection, involving identifying a first object referenced by a second object, determining whether the address of the first object is lower than a pointer position, in response to determining that the address of the first object is lower than the pointer position, adding an identifier for the first object to a mark stack, determining whether a number of identifiers in the mark stack has reached a flush threshold, in response to determining that the number of identifiers in the mark stack has reached the flush threshold, setting a set of marks included in a mark bitmap to grey, setting a region field of a rescan map to indicate that a region of the mark bitmap includes any of the set of marks, and performing a rescan of the region based on the region field.

18 Claims, 18 Drawing Sheets

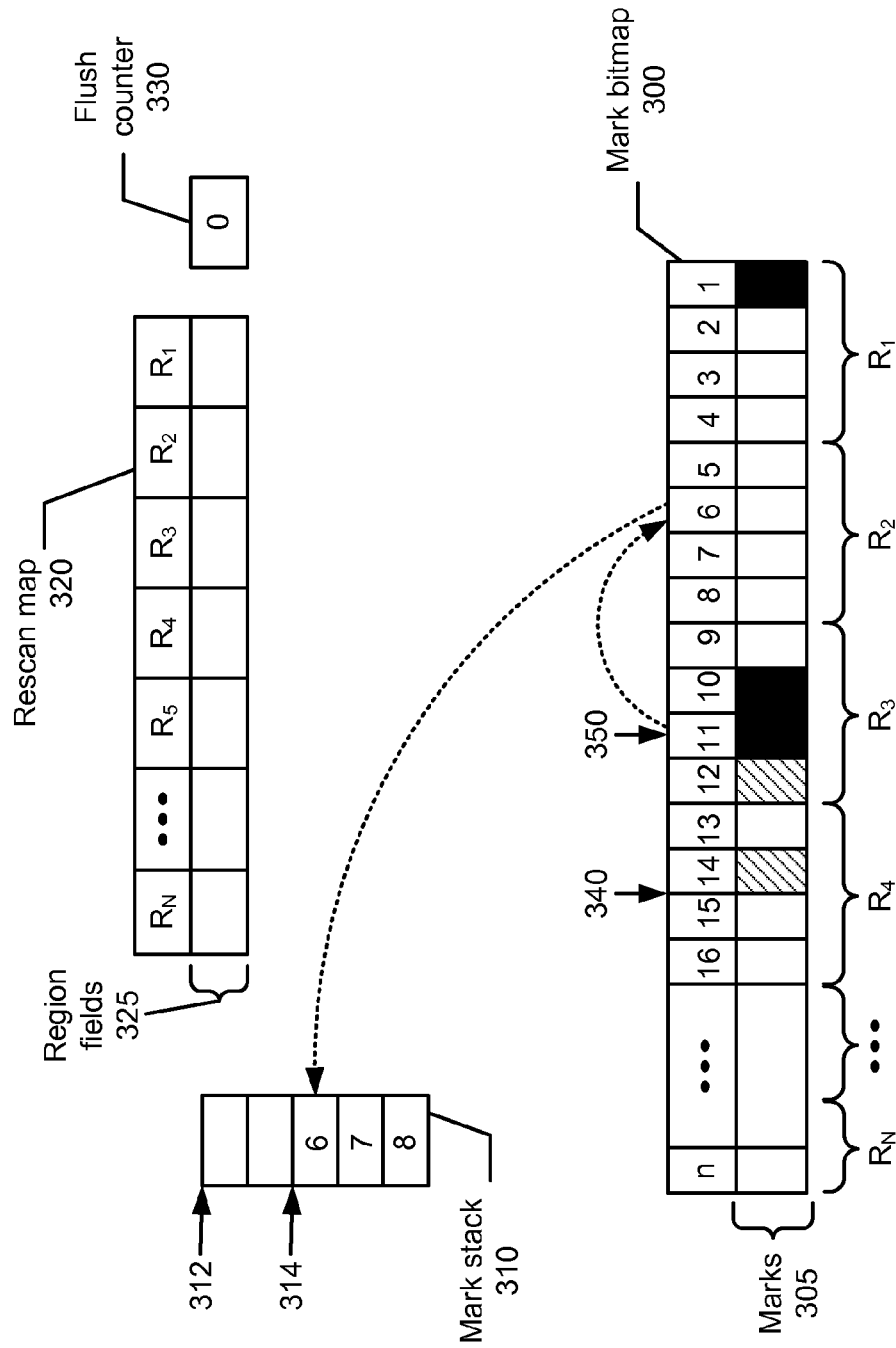

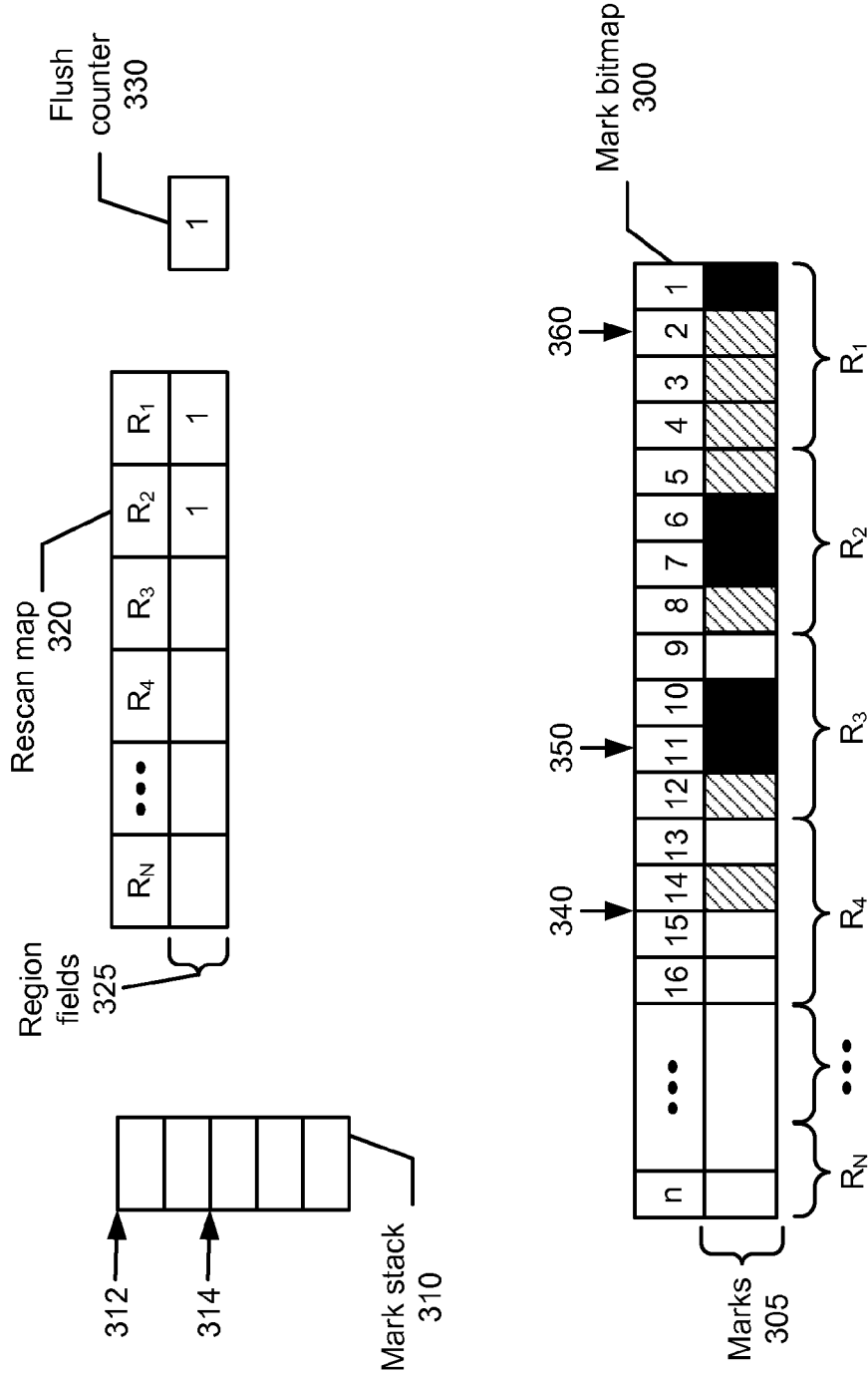

MARKING ALGORITHM FOR GARBAGE COLLECTION USING A RESCAN MAP

BACKGROUND

In computer systems, garbage collection refers to automated memory reclamation. Specifically, a garbage collector is a process that differentiates between live objects (i.e., objects that are still in use) and dead objects (i.e., objects that are no longer in use). Differentiating between live objects and dead objects typically involves traversing a graph of live objects to identify objects that should not be discarded.

Once live objects are identified, the garbage collector frees memory occupied by dead objects, and the freed memory is then available for other uses. In contrast, manual memory reclamation requires software developers to write code to explicitly free memory when objects are no longer needed. Errors in manual memory reclamation code may result in unnecessarily large memory footprints, memory leaks, etc. Thus, garbage collection reduces the probability of such errors occurring.

SUMMARY

In general, in one aspect, the invention relates to a computer usable storage medium having computer readable program code embodied therein. The computer readable program code is adapted to, when executed by a processor, implement a method for garbage collection. The method comprises: identifying a first data object referenced by a second data object; determining whether the address of the first data object is lower than a pointer position, wherein the pointer position is the address of the second data object; in response to determining that the address of the first data object is lower than the pointer position, adding an identifier for the first data object to a mark stack; determining whether a number of identifiers in the mark stack has reached a predefined flush threshold, wherein each identifier in the mark stack is associated with a different one of a set of data objects; in response to determining that the number of identifiers in the mark stack has reached the predefined flush threshold: setting a set of marks included in a mark bitmap to grey, wherein each of the set of marks is associated with a different one of the set of data objects, setting at least one region field of a rescan map to indicate that at least one region of the mark bitmap includes any of the set of marks, wherein the at least one region field is associated with the at least one region of the mark bitmap; and based on the at least field of the rescan map, performing a rescan of the at least one region.

In general, in one aspect, the invention relates to a system comprising a processor, a physical memory; and a computer usable storage medium having computer readable program code embodied therein. The computer readable program code is adapted to, when executed by the processor, implement a method for garbage collection. The method comprises: identifying a first data object referenced by a second data object; determining whether the address of the first data object is lower than a pointer position, wherein the pointer position is the address of the second data object; in response to determining that the address of the first data object is lower than the pointer position, adding an identifier for the first data object to a mark stack; determining whether a number of identifiers in the mark stack has reached a predefined flush threshold, wherein each identifier in the mark stack is associated with a different one of a set of data objects; in response to determining that the number of identifiers in the mark stack has reached the predefined flush threshold: setting a set of marks included in a mark bitmap to grey, wherein each of the set of marks is associated with a different one of the set of data objects, setting at least one region field of a rescan map to indicate that at least one region of the mark bitmap includes any of the set of marks, wherein the at least one region field is associated with the at least one region of the mark bitmap; and based on the at least field of the rescan map, performing a rescan of the at least one region.

In general, in one aspect, the invention relates to a computer usable storage medium having computer readable program code embodied therein. The computer readable program code is adapted to, when executed by a processor, implement a method for garbage collection. The method comprises: receiving an indication that a number of identifiers included in a mark stack has reached a predefined flush threshold, wherein each identifier in the mark stack is associated with a different one of a set of data objects, in response to receiving the indication that the number of identifiers included in the mark stack has reached the predefined flush threshold: setting a set of marks included in a mark bitmap to grey, wherein each of the set of marks is associated with a different one of the set of data objects, setting at least one region field of a rescan map to indicate that at least one region of the mark bitmap includes any of the set of marks, wherein the at least one region field is associated with the at least one region of the mark bitmap; and based on the at least field of the rescan map, performing a rescan of the at least one region.

BRIEF DESCRIPTION OF DRAWINGS

FIGS. 3A-3K show diagrams of exemplary data structures for garbage collection in accordance with one or more embodiments of the invention.

DETAILED DESCRIPTION

Figure 1:
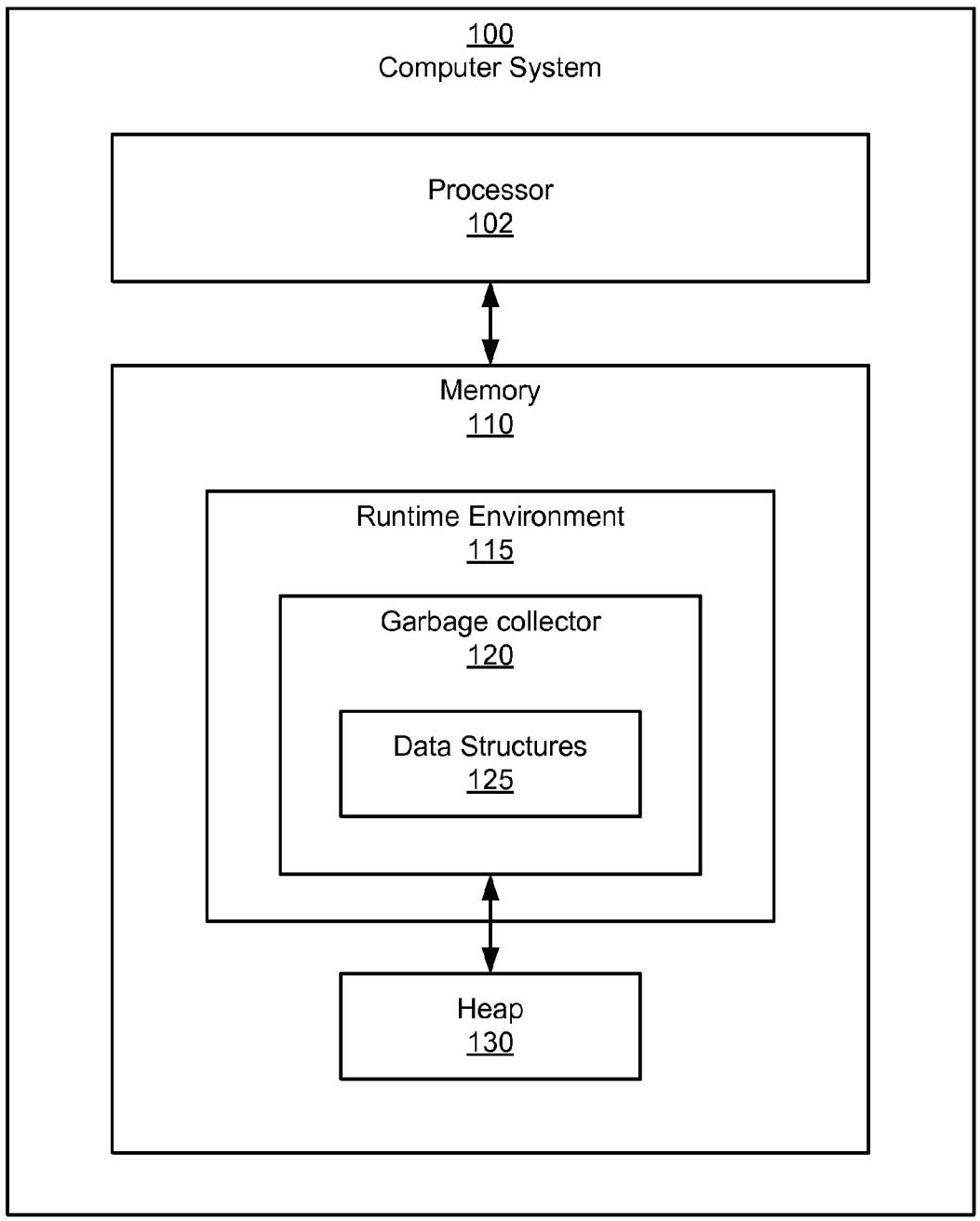
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for garbage collection. More specifically, embodiments of the invention relate to tracing active data objects to perform garbage collection of heap memory. In one or more embodiments of the invention, data structures store garbage collection information describing scanned data objects, thereby enabling faster recovery from overflows of a mark stack used to trace active data objects FIG. 1 shows a diagram of a computer system (100) in accordance with one or more embodiments of the invention. As shown in FIG. 1, the computer system (100) includes a processor (102) for executing applications and software instructions configured to perform various functionalities, and memory (110) for storing software instructions and application data. Software instructions to perform embodiments of the invention may be stored on any tangible computer readable medium such as a compact disc (CD), a diskette, a tape, a memory stick such as a jump drive or a flash memory drive, or any other computer or machine readable storage device that can be read and executed by the processor (108) of the computing device. The memory (110) may be flash memory, a hard disk drive (HDD), persistent storage, random access memory (RAM), read-only memory (ROM), any other type of suitable storage space, or any combination thereof.

As shown in FIG. 1, the memory (110) may include a runtime environment (115) and a heap (130). The heap (130) may be a pool of memory which is available for storing data objects required by one or more applications currently being executed by the processor (102). In one or more embodiments, the runtime environment (115) may be a multi-tasking managed run-time environment configured to simultaneously execute multiple applications. For example, the runtime environment (115) may be a Java™ virtual machine, a Microsoft® .NET framework, an operating system, or any other runtime environment that supports garbage collection. Java™ is a trademark of Sun Microsystems, Inc. located in Santa Clara, Calif. Microsoft® is a registered trademark of Microsoft Corporation located in Redmond, Wash.

In one or more embodiments, the runtime environment (115) includes a garbage collector (120) configured to perform garbage collection within the heap (130). In other words, the garbage collector (120) is an application for freeing memory allocated to inactive objects (i.e., objects that are no longer in use by an application). Once deallocated (i.e., freed) by the garbage collector (120), memory may be used to allocate to new data objects which may be required by an application. Those skilled in the art will appreciate that the garbage collector (120) may operate concurrently with the execution of one or more applications (not shown) executing in the runtime environment (115).

In one embodiment, the garbage collector (120) may include data structures (125) configured for use in identifying objects that are not reachable by any reference in a current program, and which are thus inactive objects. The data structures (125) are described further below with reference to FIGS. 3A-3K in accordance to one or more embodiments.

Figure 2:
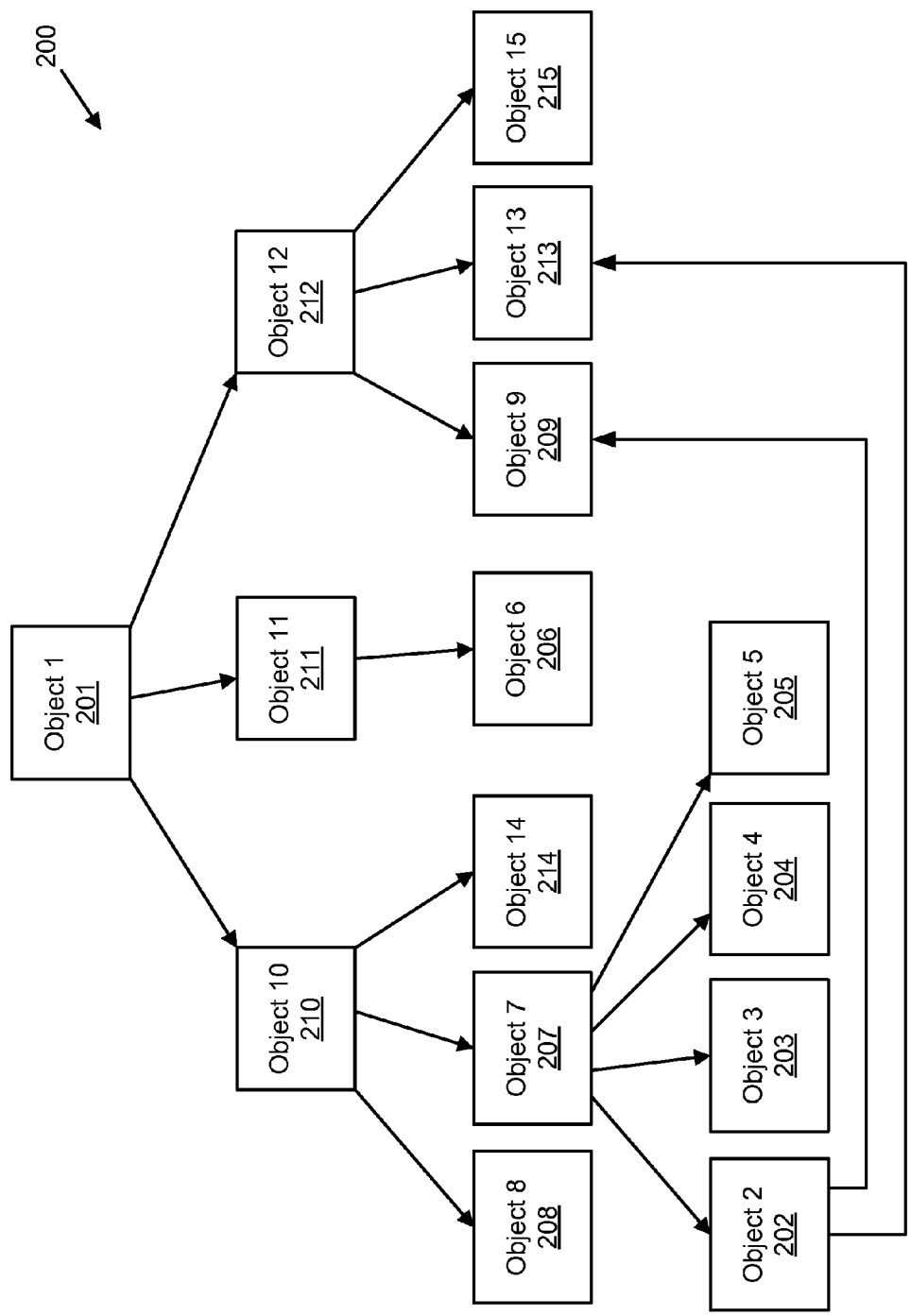
FIG. 2 shows a diagram of an exemplary set of data objects in accordance with one or more embodiments of the invention.

FIG. 2 shows a diagram of an exemplary set of data objects in accordance with one or more embodiments of the invention. Specifically, FIG. 2 shows a set of data objects (200) which may be stored within the heap (130). The set of data objects (200) includes a data object 1 (201). In this example, data object 1 (201) is a root object, meaning a data object assumed to be active (i.e., reachable by a current application) by virtue of a location and/or a property of the data object. For example, root objects may include all objects reachable from references stored in local variables and parameters in the applications currently in use, as well as references stored in any global variables. In one embodiment, the memory allocated to any data object determined to be active is not deallocated by the garbage collector (120).

As shown in FIG. 2, data object 1 (201) includes references (indicated by arrows) to three other data objects, namely data object 10 (210), data object 11 (211), and data object 12 (212). In other words, the three referenced data objects are referenced by an active root object (i.e., data object 1 (201)), and are thus determined to be active as well. Note that each referenced data object may also reference one or more other data objects. For example, as shown in FIG. 2, data object 10 (210) references data object 8 (208), data object 7 (207), and data object 14 (214). Further, as also shown in FIG. 2, data object 7 (207) references data object 2 (202), data object 3 (203), data object 4 (204), and data object 5 (205).

FIGS. 3A-3K show exemplary diagrams of data structures (125) in accordance with one or more embodiments of the invention. Specifically, FIGS. 3A-3K show diagrams of a mark bitmap (300), a mark stack (310), a rescan map (320), and a flush counter (330). Further, FIGS. 3A-3K show the changing states of the aforementioned diagrams (i.e., (300)-(330)) after multiple time periods during a garbage collection operation of the heap (130) (shown in FIG. 1). Those of skill in the art will recognize that the data structures, shown in FIGS. 3A-3K, are simplified for the sake of illustration and are not intended to be limiting of the invention.

Figure 3A:
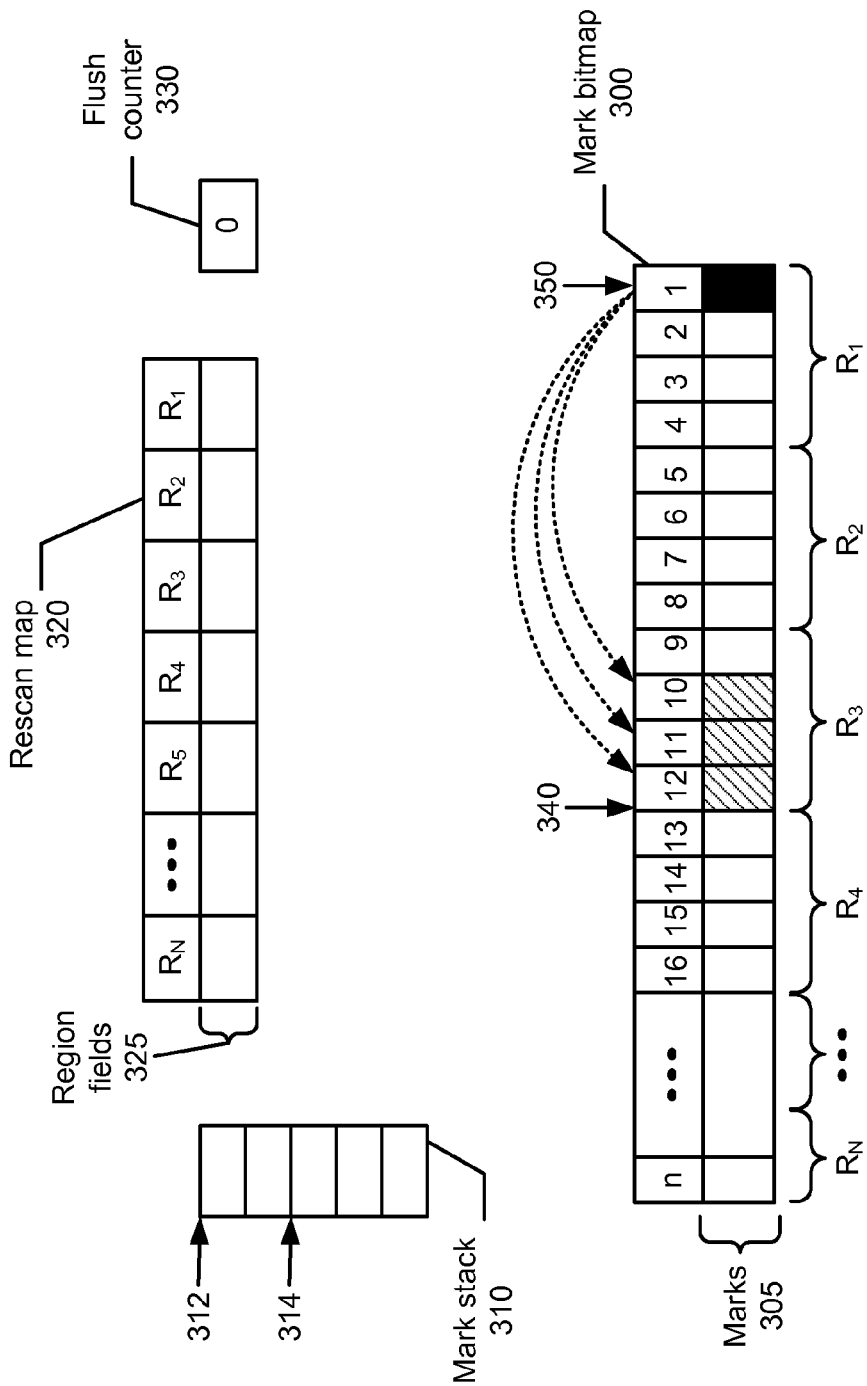

As shown in FIG. 3A, the mark bitmap (300) includes a set of n marks (305), each indicating a status of a corresponding data object (i.e., data objects 1 to n). In one or more embodiments, a mark (305) encodes a status with a fixed number of consecutive binary digit in the mark bitmap (300). For example, a single mark (305) may include the binary digits "0, 0" to represent a white color, the binary digits "1, 1" to represent a black color, and the binary digits "0, 1" to represent a grey color.

In one or more embodiments, the mark bitmap (300) may be arranged such that the index of a mark (305) in the mark bitmap (300) corresponds to an offset in the heap (130) from a base heap address. Thus, for the sake of illustration, assume that the labels 1 to n of the marks (305) match object addresses within the heap (130). Further, the mark bitmap (300) may be divided into N regions (labeled $R_1$ to $R_N$). Optionally, each region of the mark bitmap (300) may include a uniform number of marks (305) (e.g., 4 marks per region, 10 marks per region, etc.). In one or more embodiments, the rescan map (320) may include multiple region fields (325), with each region field (325) corresponding to a different region of the mark bitmap (300). For example, as shown in FIG. 3A, the rescan map (320) includes N region fields (325), corresponding to regions $R_1$-$R_N$ of the mark bitmap (300).

In one or more embodiments, a mark (305) may be set to a black color to indicate that a corresponding data object has been determined to be active (i.e., is a root object or is referenced by an active data object), and has been examined to determine whether it references any other data objects. Further, the mark (305) may be set to a grey color to indicate that the corresponding data object has been determined to be active, but has not yet been examined to determine whether it references any other data objects. Additionally, the mark (305) may be set to a white color to indicate that a corresponding data object has not yet been determined to be active or inactive.

Referring to FIG. 3A, assume that the garbage collector (120) has initiated a garbage collection operation of the heap (130), which includes the data objects (200) shown in FIG. 2. As discussed above with reference to FIG. 2, data object 1 (201) is a root object which references data object 10 (210), data object 11 (211), and data object 12 (212). Accordingly, as shown in FIG. 3A, mark "1" (i.e., the mark corresponding to data object 1 (201)) is set to black, indicating that data object 1 (201) is active and has been examined for references to other data objects. For the sake of illustration, the references included in data object 1 (201) are shown as dotted arrows from mark "1" to the marks "10," "11," and "12," corresponding respectively to data object 10 (210), data object 11 (211), and data object 12 (212).

In one embodiment, a pointer referred to as a "finger" (350) may be set at the address of the data object being visited (i.e., being examined for references to other data objects). Thus, as shown in FIG. 3A, the finger (350) is set to the location of mark "1." The finger (350) has the property that there are not any black objects past its position in the mark bitmap. Further, a maximum pointer (340) may be set to indicate the highest address of any data object which has been visited or referenced thus far in the current garbage collection operation. Thus, in this example, the maximum pointer (340) is set to mark "12." The maximum pointer (340) may be used to avoid scanning unnecessarily the end of the mark bitmaps when the finger (350) reaches the maximum pointer (340).

Note that data object 10 (210), data object 11 (211), and data object 12 (212) each have a higher address than the finger (350). In one or more embodiments, data objects which have higher addresses that the finger (350) may be marked as grey (i.e., determined to be active but not yet been examined for references to other data objects). Accordingly, as shown in FIG. 3A, the marks (305) corresponding to data object 10 (210), data object 11 (211), and data object 12 (212) are marked as grey.

Figure 3B:
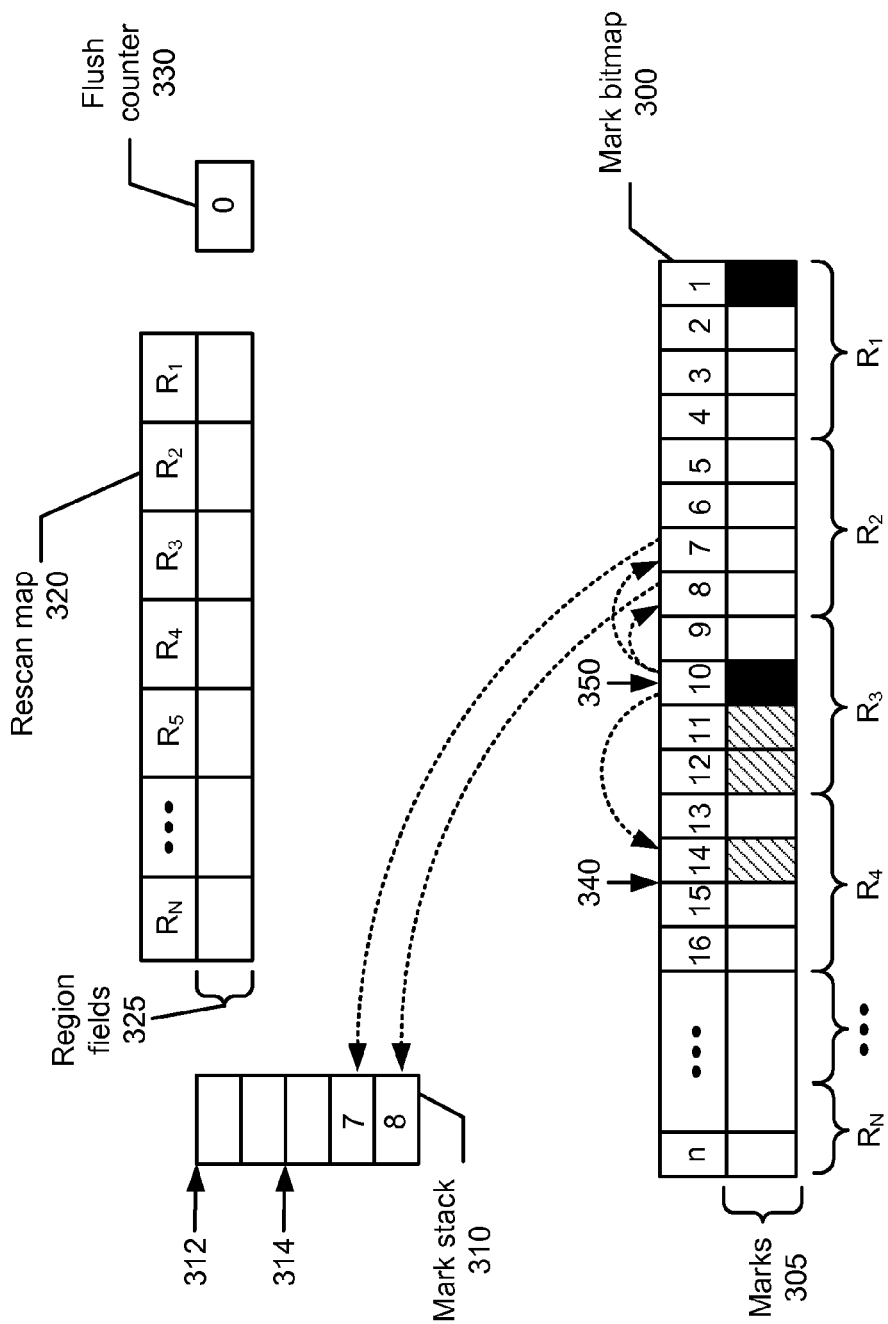

FIG. 3B shows a second stage of an example garbage collection operation, in accordance with one or more embodiments of the invention. Specifically, after visiting data object 1 (201), the finger (350) is moved to the next higher address having a grey mark (350), specifically mark "10," thus indicating that data object 10 (210) is visited next. As shown in FIG. 2, data object 10 (210) includes references to data object 7 (207), data object 8 (208), and data object 14 (214).

As described above, in one or more embodiments, visited data objects may be marked black, and data objects which have higher addresses that the finger (350) may be marked as grey. Accordingly, as shown in FIG. 3B, mark "14" is marked grey, and mark "10" is marked black. Additionally, the maximum pointer (340) may be set to mark "14." Further, in one or more embodiments, data objects which have lower addresses that the finger (350) may be identified in a mark stack (310). Specifically, the mark stack (310) may include identifiers for any non-visited data objects which are referenced by a data object having a higher address. Accordingly, as shown in FIG. 3B, identifiers "7" and "8"0 (corresponding to data object 7 (207) and data object 8 (208)) may be inserted into the mark stack (310).

FIG. 3C shows a third stage of an example garbage collection operation, in accordance with one or more embodiments of the invention. Specifically, the finger (350) is moved to mark "11," thus indicating that data object 11 (211) is the next higher grey object within the mark bitmap (300). As shown in FIG. 2, data object 11 (211) includes a reference to data object 6 (206). Note that data object 6 (206) has a lower address than the current position of the finger (350). Accordingly, an identifier "6" (corresponding to object 6 (206)) is added to the mark stack (310). Further, mark "11" is set to (i.e., marked as) black.

Note that, with the addition of the identifier "6," the number of identifiers in the mark stack (310) has reached a drain threshold (314). In one or more embodiments, when the drain threshold (314) of the mark stack (310) is reached, the garbage collector (120) may be configured to drain the mark stack (310). More specifically, the garbage collector (120) may sequentially remove each identifier from the mark stack (310) and visit the data object corresponding to the removed identifier. The garbage collector (120) may continue draining the mark stack (310) until it is empty (i.e., all identifiers have been removed and processed).

Figure 3D:
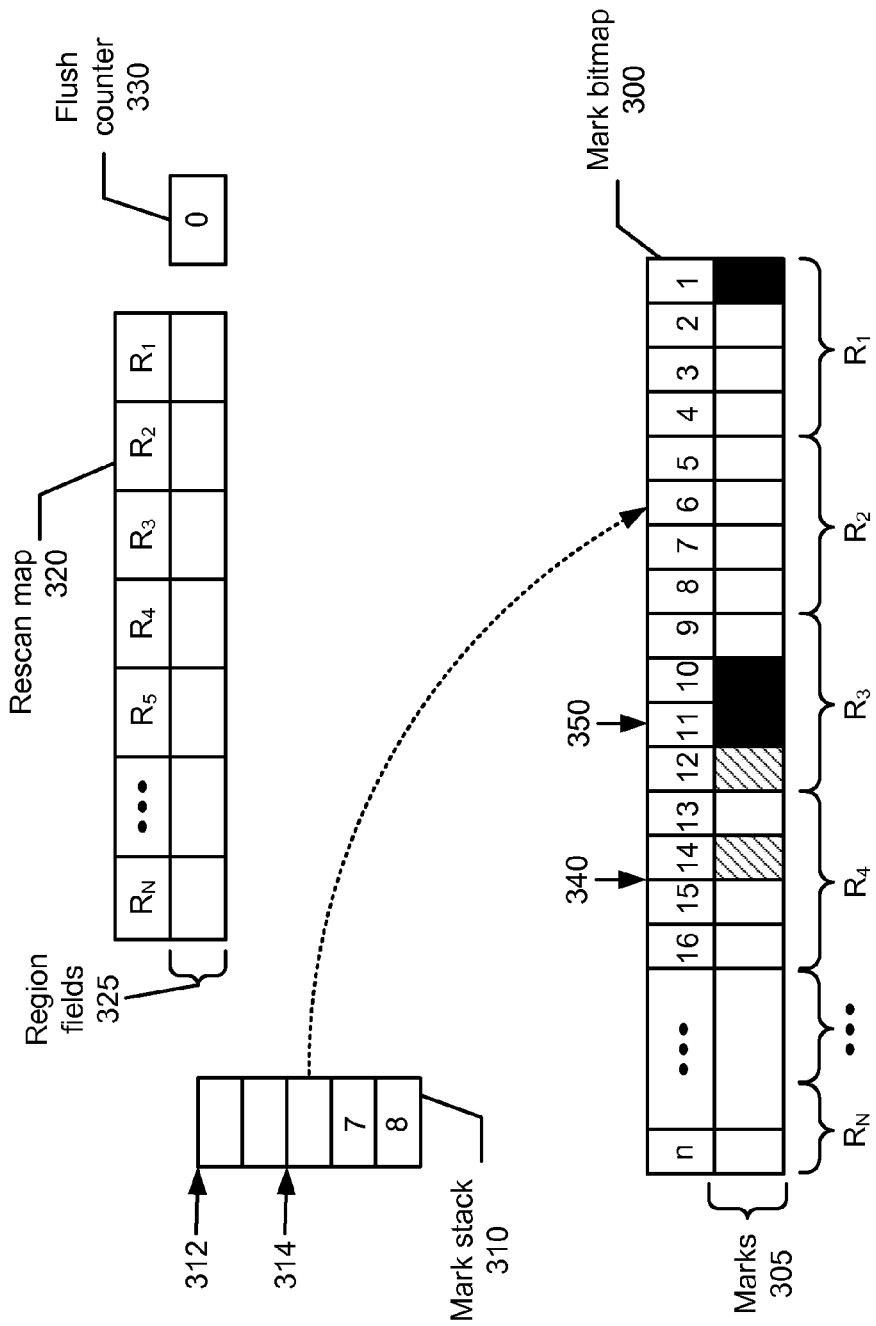
Figure 3E:
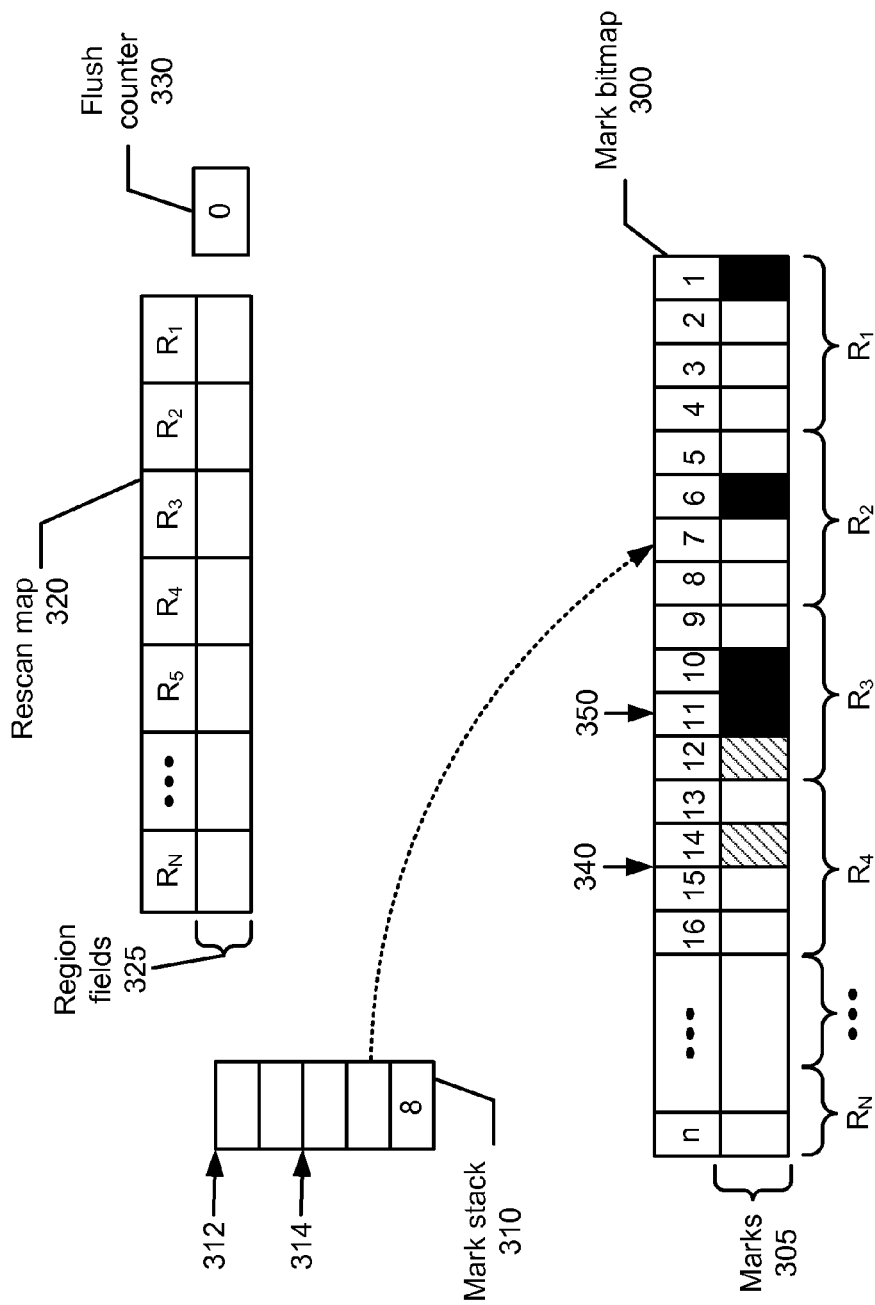

FIG. 3D shows an initial step in draining of mark stack (310), namely removing the identifier "6" from the mark stack (310). As shown in FIG. 2, data object 6 (206) does not reference any other data objects. Accordingly, as shown in FIG. 3E, mark "6" may be set to black, and the draining of mark stack (310) may continues by removing the identifier "7" from the mark stack (310).

Figure 3F:
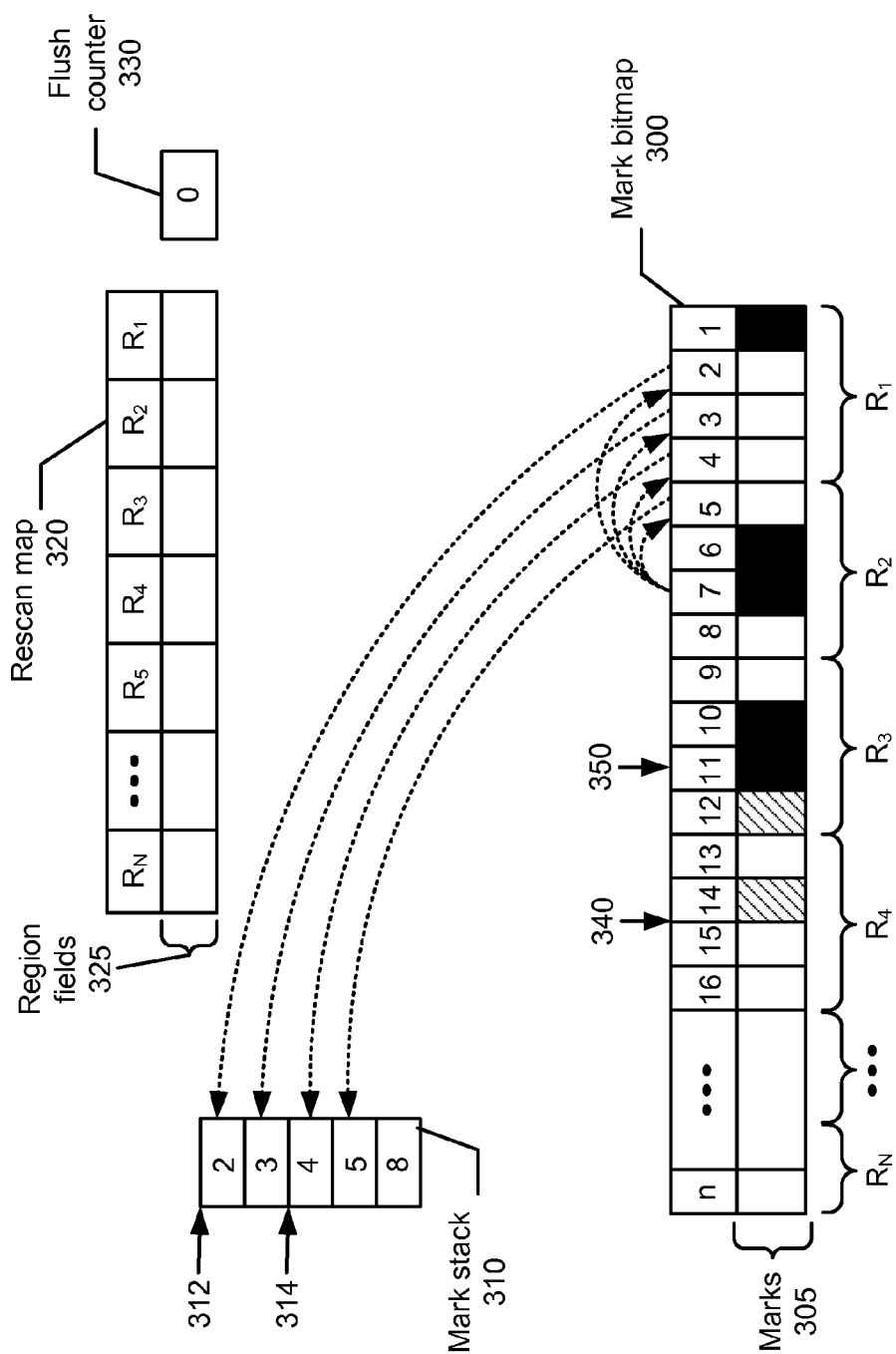

Referring to FIG. 3F, the finger (350) remains set on mark "11" and mark "7" may be set to black. As shown in FIG. 2, data object 7 (207) references data object 2 (202), data object 3 (203), data object 4 (204), and data object 5 (205). Note that each data object referenced by data object 7 (207) has a lower address than the current position of the finger (350). Accordingly, as shown in FIG. 3F, identifiers "2," "3," "4," and "5" may be inserted into the mark stack (310).

Note that, with the addition of the identifiers "2," "3," "4," and "5," the number of identifiers in the mark stack (310) has reached a flush threshold (312). In one or more embodiments, the flush threshold (312) may indicate that no more space is available on the mark stack. Further, in one or more embodiments, when the flush threshold (312) of the mark stack (310) is reached, the garbage collector (120) may be configured to flush the mark stack (310). More specifically, as shown in FIG. 3F, flushing the mark stack (310) may be performed by removing all identifiers from the mark stack (310) at once, and setting the marks (305) corresponding to the removed identifiers (i.e., identifiers "2," "3," "4," "5," and "6") to grey.

Figure 3G:
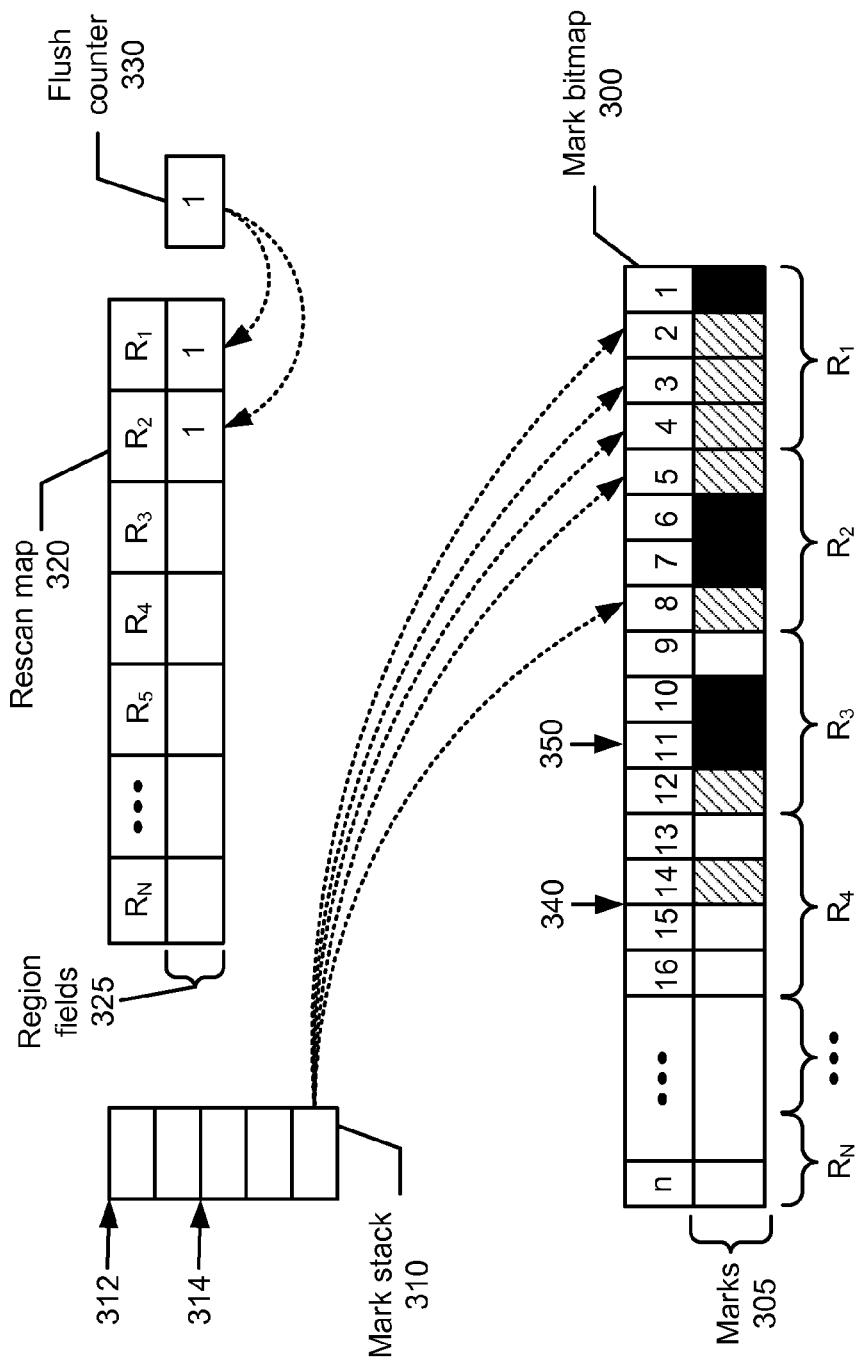

In one or more embodiments, a flush counter (330) may be incremented each time the mark stack (310) is flushed when the mark bitmap (300) is not being rescanned. For example, as shown in FIG. 3G, the flush counter (330) is incremented to value "1," indicating that the mark stack (310) has been flushed one time. Further, in one or more embodiments, the value of the flush counter (330) may be stored in region fields (325) corresponding to regions of the mark bitmap (300) which include marks (305) set to grey as part of flushing the mark stack (310). For example, as shown in FIG. 3G, the marks (305) corresponding to the removed identifiers (i.e., identifiers "2," "3," "4," "5," and "8") are located in regions $R_1$ and $R_2$ of the mark bitmap (300). Thus, the region fields (325) labeled $R_1$ and $R_2$ may be set to the flush counter value "1." Additionally, in one or more embodiments, a rescan pointer (360) may be initialized to the mark (305) of the object with the lowest address among those objects whose identifiers were removed from the mark stack (310). For example, referring to FIG. 3H, the data object removed from mark stack (310) with the lowest address is the data object 2. Consequently, the rescan pointer (360) is set to the mark "2".

In one or more embodiments, after flushing the mark stack (310), rescan processing of the mark bitmap (300) may begin. Note that the finger (350) remains at its last position, on data object 11. The finger (350) acts as an upper bound where rescanning may stop. Further, during rescanning, any data object located at an address higher than the address corresponding to the finger (350) is greyed by setting the corresponding mark in the mark bitmap (300) to grey, whereas any data object located at an address lower than the address corresponding to the finger (350) is greyed by pushing its identifier on the mark stack (310). The reason for this is that rescanning is not iterating over all marks (305) of the mark bitmap (300), but rather iterating only over marks (305) located in regions corresponding to region fields (325) matching the current value of the flush counter (330).

Following the initial setting of the rescan pointer (360), rescan processing proceeds by finding the first grey mark (305) in the region. For example, referring again to FIG. 3H, the first grey mark is "2." As shown in FIG. 2, data object 2 (202) includes references to data object 9 (209) and data object 13 (213). Note that data object 13 (213) has a higher address than the current position of the finger (350), which is set on mark 11 (211). Accordingly, the mark (305) for data object 13 is set to grey. Further, data object 9 (209) has an address lower than the current position of the finger (350). Thus, data object 9 (209) is inserted on the mark stack (310). Next, the mark (305) for data object 2 (202) is set to black to indicate that it has been visited, and the rescan pointer (360) is positioned to the next grey object in the region $R_1$ (i.e., data object 3).

Referring again to FIG. 3H, the remaining grey objects in region $R_1$ (i.e., data objects 3 and 4) are visited next in the rescan process. Note that, as shown in FIG. 2, data objects 3 and 4 are leaf objects (i.e., they do not include references to other data objects). Therefore, visiting data objects 3 and 4 neither sets new grey marks to the mark bitmap (300) nor adds new references to the mark stack (310).

Figure 3I:
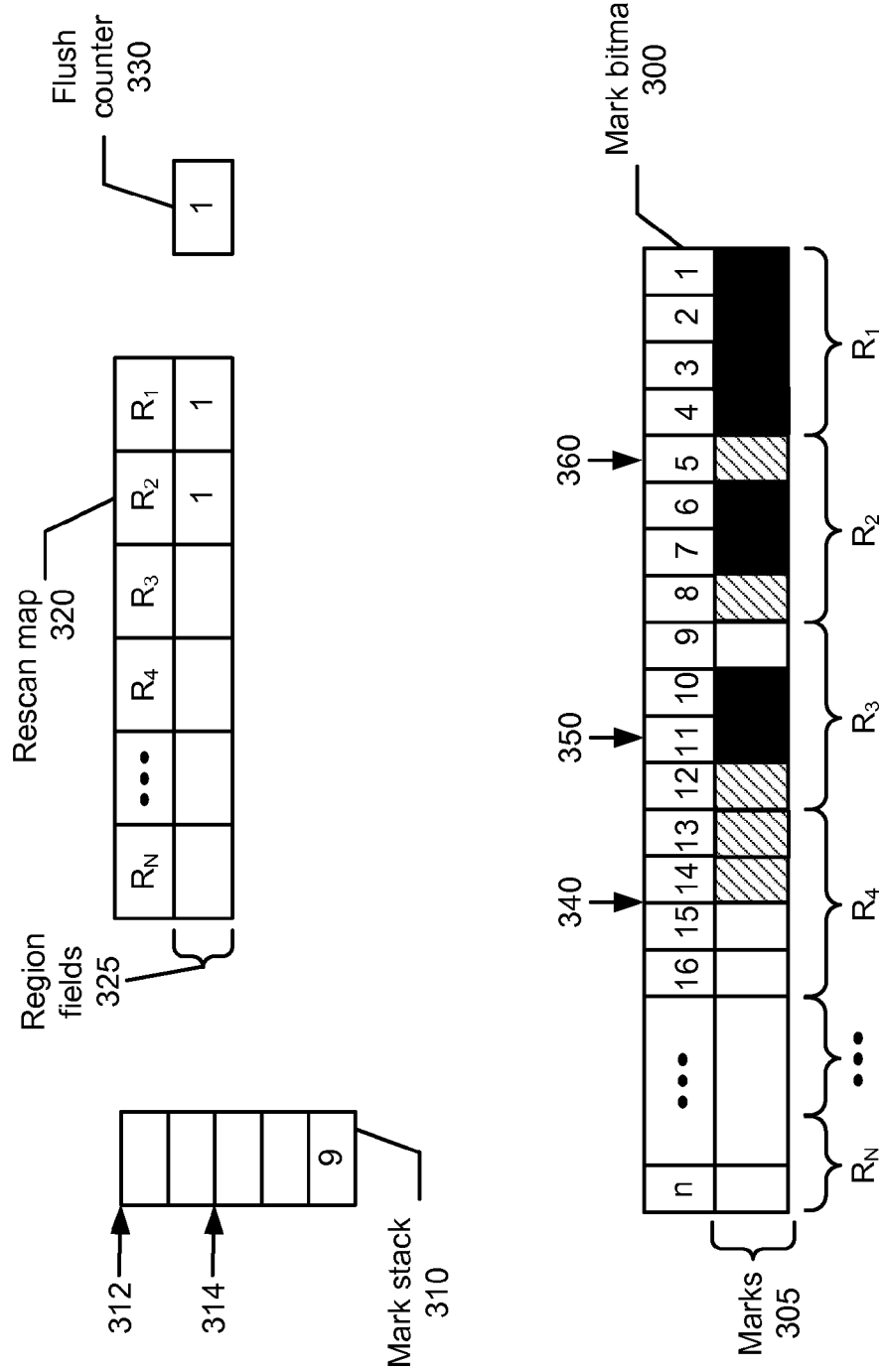

Upon reaching the end of region $R_1$, rescan processing proceeds with finding the next region field (325) of the rescan map (320) that matches the current value of the flush counter (330). Referring now to FIG. 3I, the next region field (325) having a value of "1" (i.e., the current value of the flush counter (330)) is the region field (325) corresponding to region $R_2$. Thus, the rescan pointer (360) is positioned to the first grey mark in region $R_2$, namely the mark (305) for data object 5 (205). After rescanning of region $R_2$, the marks (305) for data object 5 and data object 8 are set to black, and no additional data objects have their marks (305) set to grey or their references added to the mark stack (310).

Figure 3J:
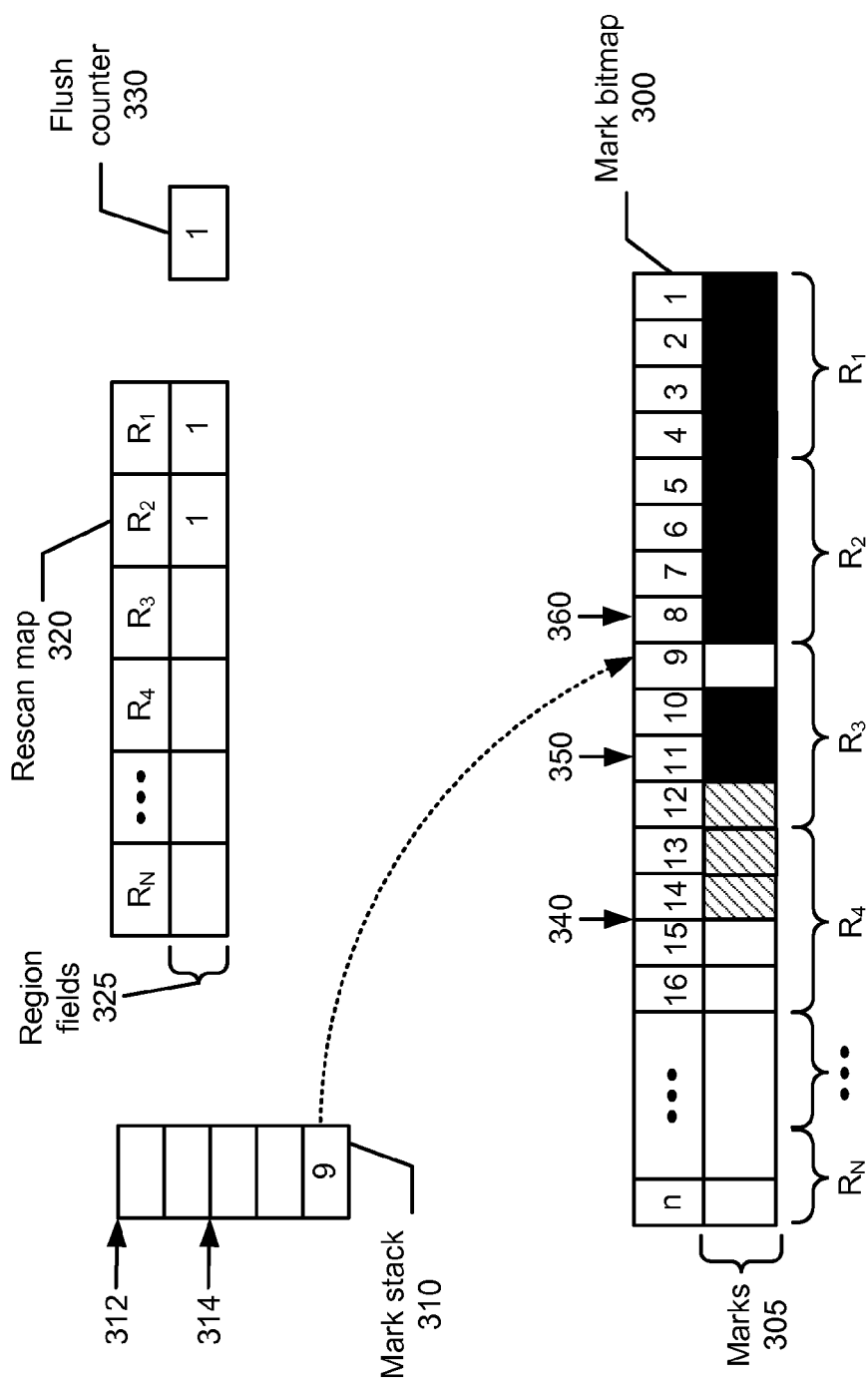
Figure 3K:
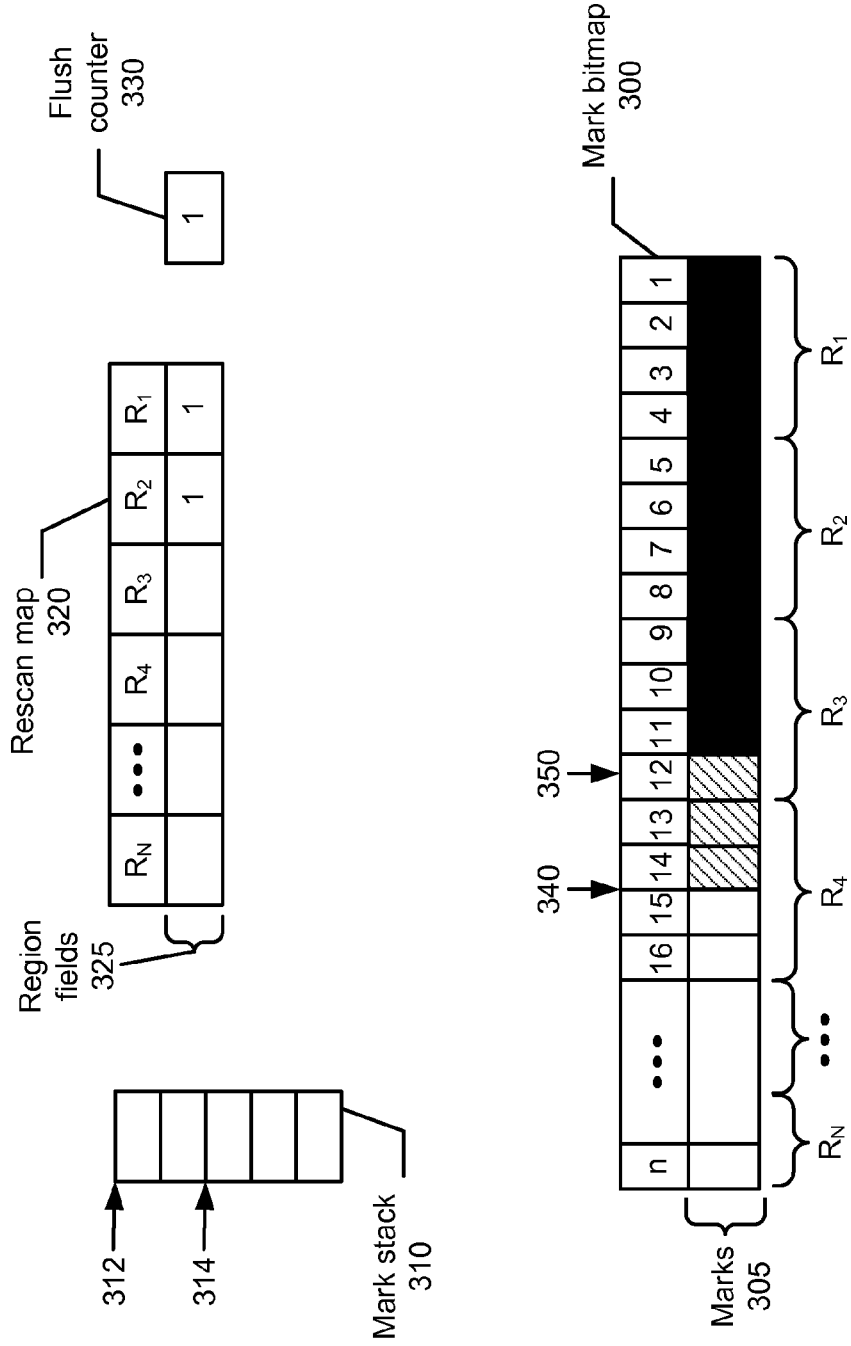

In one or more embodiments, iterating over the rescan map (320) to find region fields (325) that match the current value of the flush counter (330) stops at the region field (325) that corresponds to the data object pointed to by the finger (350). Referring to FIG. 3J, the region of the mark bitmap (300) which includes the finger (350) is region $R_3$. Note that the marks (305) corresponding to region $R_3$ aren't iterated over because the region field (325) corresponding to $R_3$ doesn't match the current value of the flush counter (330).

In one or more embodiments, rescan processing ends with draining the mark stack (310) of any objects left after the rescan map (320) is scanned. Accordingly, as shown in FIG. 3J, the mark stack (310) contains a single identifier for data object 9 (209), which is then removed from the mark stack (310). As shown in FIG. 2, data object 9 (209) does not reference any other data objects. Accordingly, mark "9" may be set to black, and the mark stack (310) may be drained In one or more embodiments, when the draining of mark stack (310) completes, rescan processing is completed, and scanning of the mark bitmap (300) resumes from the position indicated by the finger (350). Accordingly, as shown on FIG. 3K, scanning of the mark bitmap (300) resumes with the next data object marked grey after the position of the finger (350), namely data object 12.

In one or more embodiments, if the mark stack (310) reaches the flush threshold (312) again during rescanning of the mark bitmap (300), the mark stack (310) is flushed, but the flush counter (330) is left unchanged. Thus, regions of the mark bitmap (300) corresponding to region fields (325) which match the current flush counter (330) may be rescanned again.

In one or more embodiments, instead of storing the value of the flush counter (330), the region fields (325) may store a Boolean value indicating whether the corresponding region may be rescanned. Specifically, in this embodiment, rescan processing consists of iterating over the rescan map (330), from the first region field (325) to the region field (325) corresponding to the region comprising the data object currently pointed to by the finger (350), in order to find a region field (325) storing the Boolean value "true." The region of the mark bitmap (300) corresponding to the region field (325) storing the Boolean value "true" is then scanned for any grey marks (305). When this region is rescanned, the corresponding region field (325) is set to the Boolean value "false" to prevent rescan in the event that the mark stack (310) is flushed again. Note that, if the mark stack (310) reaches the flush threshold (312) during rescan processing, the region fields (325) for the regions comprising the data objects referenced from the mark stack (310) are set to the Boolean value "true."

In one or more embodiments, once the entire mark bitmap (120) has been visited, all marks (305) are set to either black or white. The garbage collector (120) may then complete the current garbage collection operation by freeing any memory allocated to data objects having a mark (305) set to white, indicating that these data objects are inactive (i.e., were never reached by any active data objects). The garbage collector (120) may initiate another garbage collection operation as required. In one or more embodiments, the data structures (125) may be reset for each garbage collection operation performed.

Figure 4:
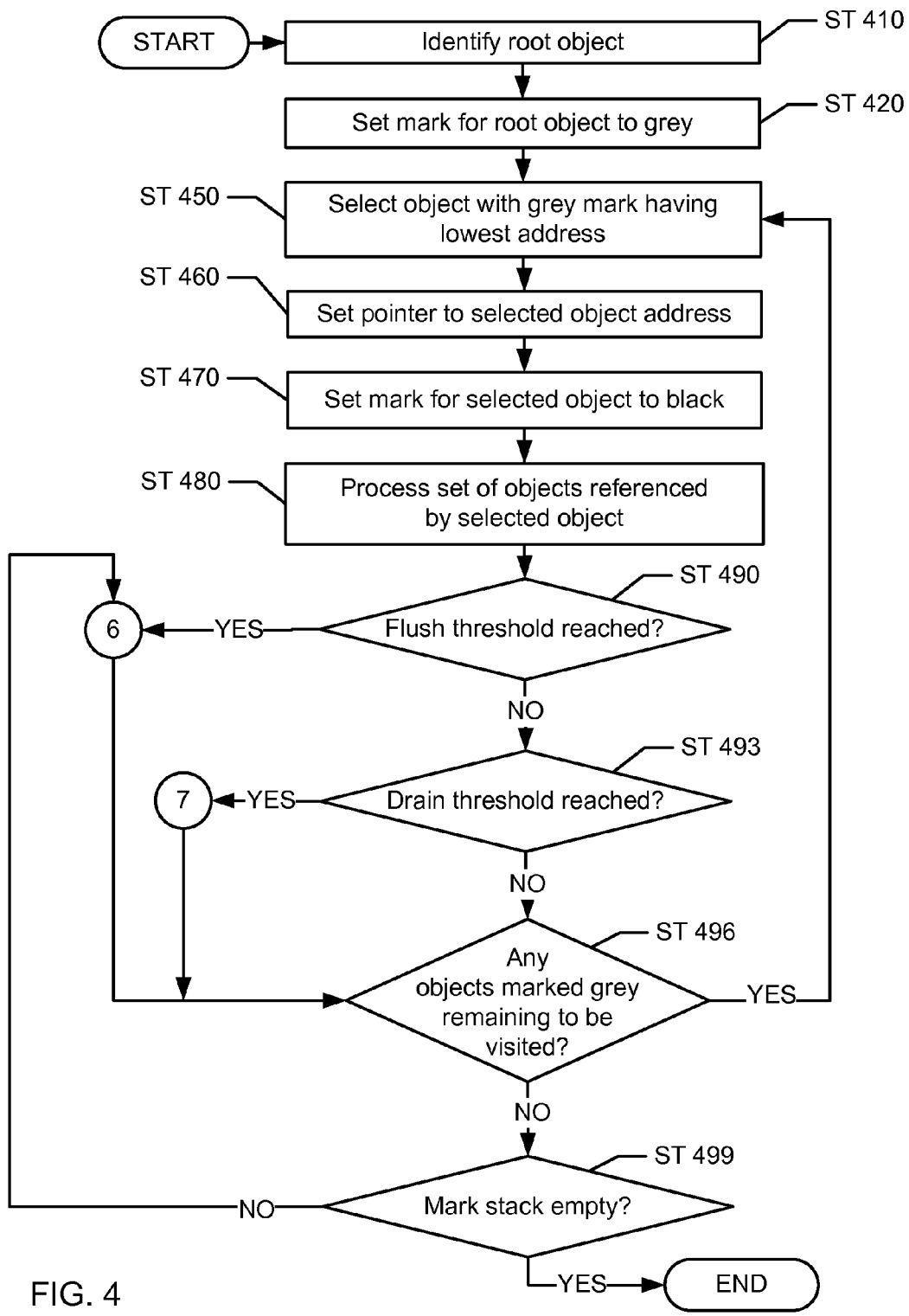
FIG. 4 shows a flowchart of a method of garbage collection in accordance with one or more embodiments of the invention.

FIG. 4 shows a flowchart of a method for garbage collection in accordance with one or more embodiments of the invention. In one or more embodiments, one or more of the steps shown in FIG. 4 may be omitted, repeated, and/or performed in a different order. Accordingly, the specific arrangement of steps shown in FIG. 4 should not be construed as limiting the scope of the invention.

At ST 410, a root object (i.e., a data object assumed to active) may be identified. For example, data object 1 (201) shown in FIG. 2 may be identified as a root object. At ST 420, a mark for the root object may be set to grey, indicating that the corresponding object has been determined to be active, but hasn't been examined yet.

At ST 450, the data object having a grey mark and the lowest address may be selected. At ST 460, a pointer may be set to the address of the selected data object (i.e., the data object selected at ST 450). For example, referring to FIG. 3A, the finger (350) is set to mark "1." At ST 470, the mark for the selected data object may be set to black, thus indicating that the selected data object has been examined. For example, referring to FIG. 3A, the mark "1" is set to black.

At ST 480, one or more data objects referenced by the selected data object may be processed. That is, each referenced data object is either set to grey or added to a mark stack, depending on the location of the referenced data object relative to the finger (350). ST 480 is described in greater detail below with reference to FIG. 5. At ST 490, a determination is made about whether a flush threshold (e.g., flush threshold (312) shown in FIG. 3F) is reached. If it is determined that the flush threshold has been reached, then the process continues on the flowchart shown in FIG. 6. In other words, FIG. 6 represents a continuation of the flowchart shown in FIG. 4. After completing the flowchart shown in FIG. 6, the process continues at ST 496 (described below).

Figure 7:
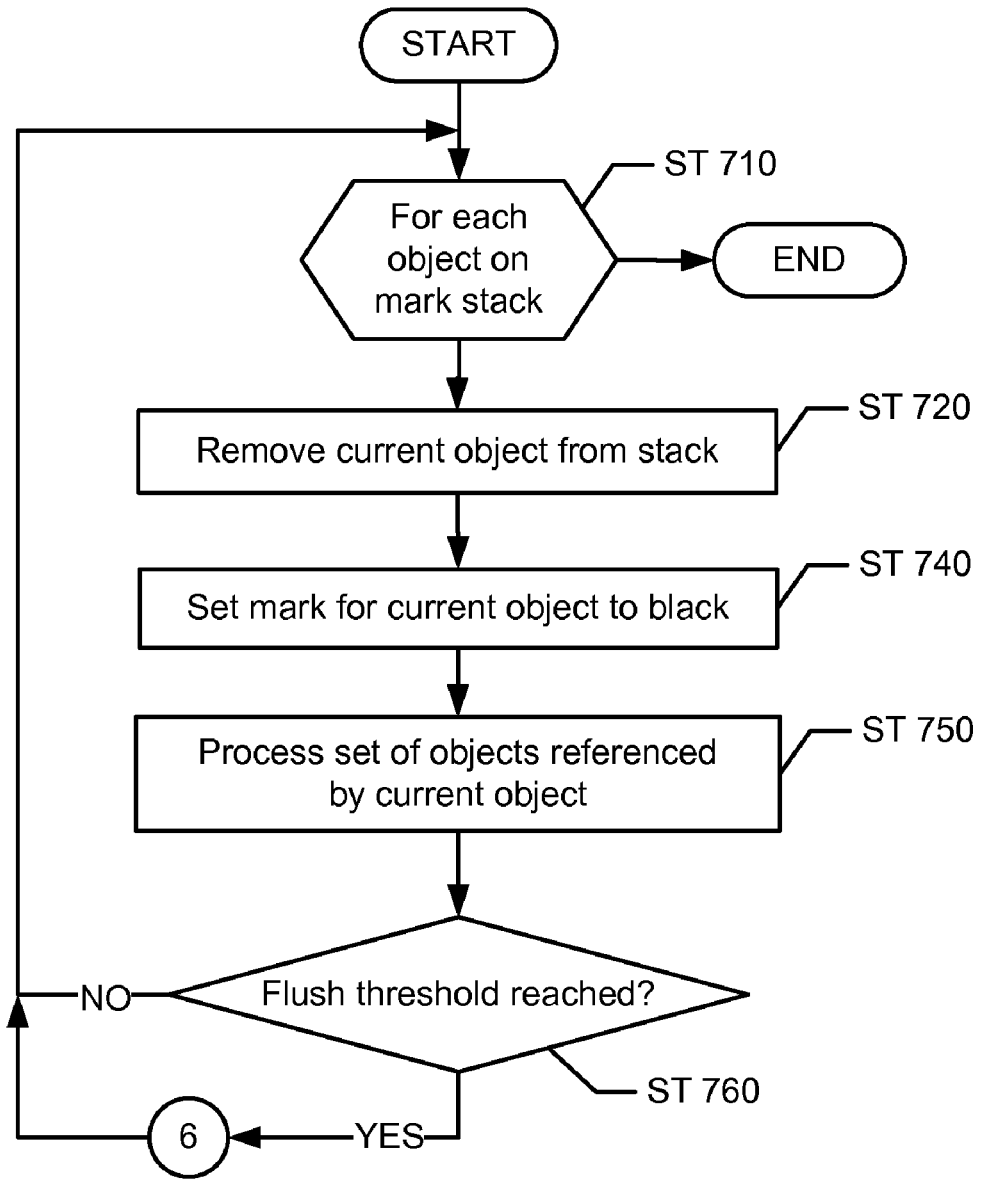
FIG. 7 shows a flow chart for draining a mark stack, in accordance with one embodiment of the invention.

However, if it determined at ST 490 that the flush threshold has not been reached, then at ST 493, a determination is made about whether a drain threshold (e.g., drain threshold (314) shown in FIG. 3F) is reached. If it is determined that the drain threshold has been reached, then the process continues on the flowchart shown in FIG. 7. In other words, FIG. 7 represents a continuation of the flowchart shown in FIG. 4. After completing the flowchart shown in FIG. 7, the process continues at ST 496 (described below).

Returning to ST 493, if it determined that the drain threshold has not been reached, then at ST 496, a determination is made about whether there are any objects remaining to be visited. Specifically, a determination is made about whether there are any remaining data objects with grey marks in the mark bitmap (i.e., mark bitmap (300) shown in FIG. 3H). In one or more embodiments, ST 496 may involve comparing the current finger (350) to a maximum pointer (i.e., maximum pointer (340) shown on FIG. 3A). The maximum pointer (340) points to the grey mark with the highest address recorded during processing of objects referenced from examined objects. Thus, if the address of the maximum pointer (340) is greater that the address of the current finger (350), then it may be determined at ST 496 that at least one grey mark remains in the mark bitmap (300). If so, then returning to ST 450, the next object with a grey mark may be selected. Selecting the next object may be performed by iterating over the marks of the mark bitmap (300), starting from the mark corresponding to the currently selected object, and continuing to the mark corresponding to the maximum pointer (340). However, if it is determined at ST 496 that there are no remaining data objects with grey marks in the mark bitmap (300) (i.e., the maximum pointer (340) is not strictly greater than the finger (350) to the last selected object), the process continues to step ST 499.

At ST 499, it is determined whether there are any identifiers remaining in a mark stack (i.e., mark stack (310) shown in FIG. 3H). If there are identifiers remaining in a mark stack, then the process continues on the flowchart shown in FIG. 6 to flush the mark stack. However, if it is determined at ST 499 that there are no more objects remaining in the mark stack, then the garbage collection process terminates.

Figure 5:
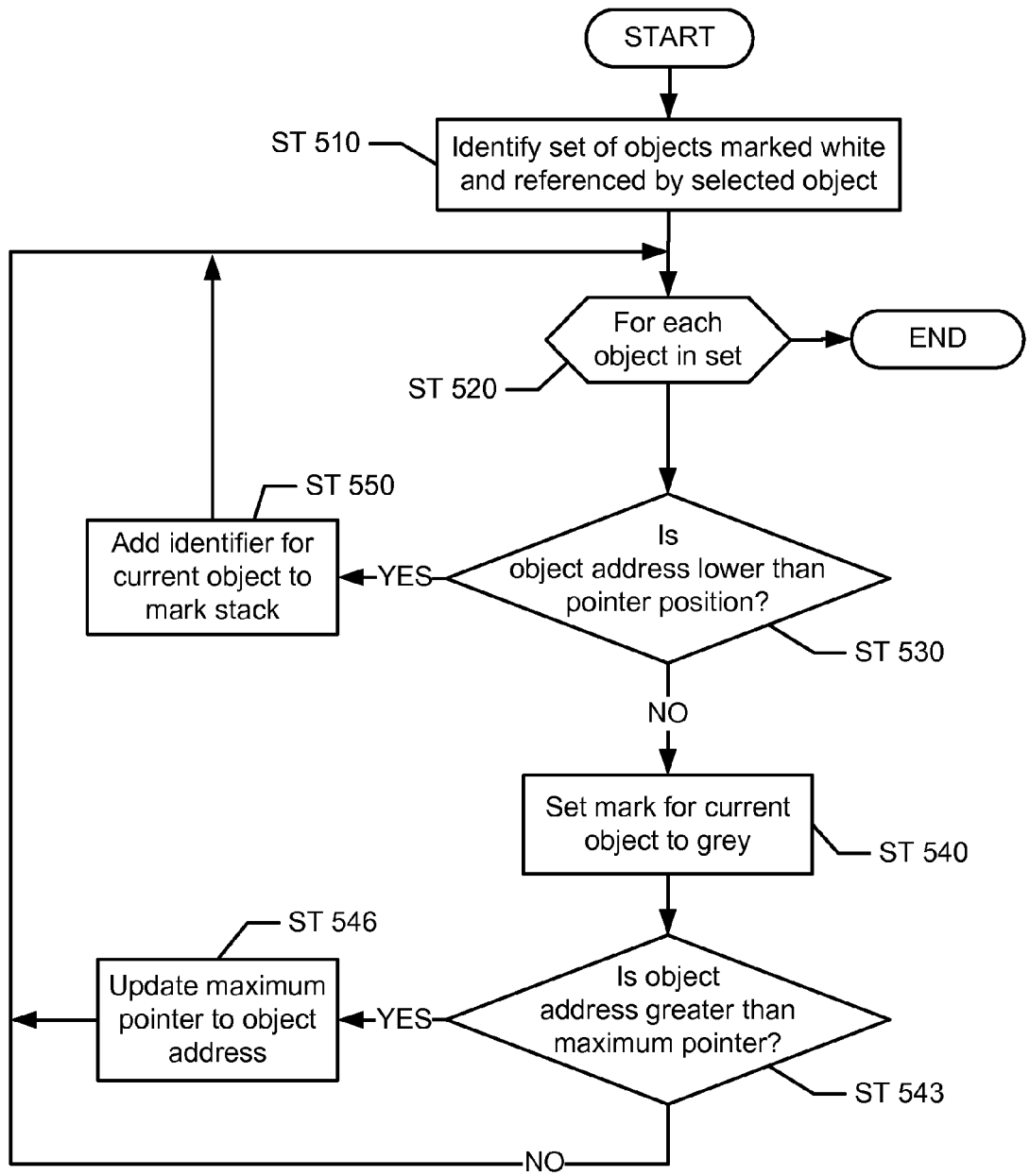
FIG. 5 shows a flow chart for processing data objects referenced by a selected data object, in accordance with one embodiment of the invention.
Figure 6:
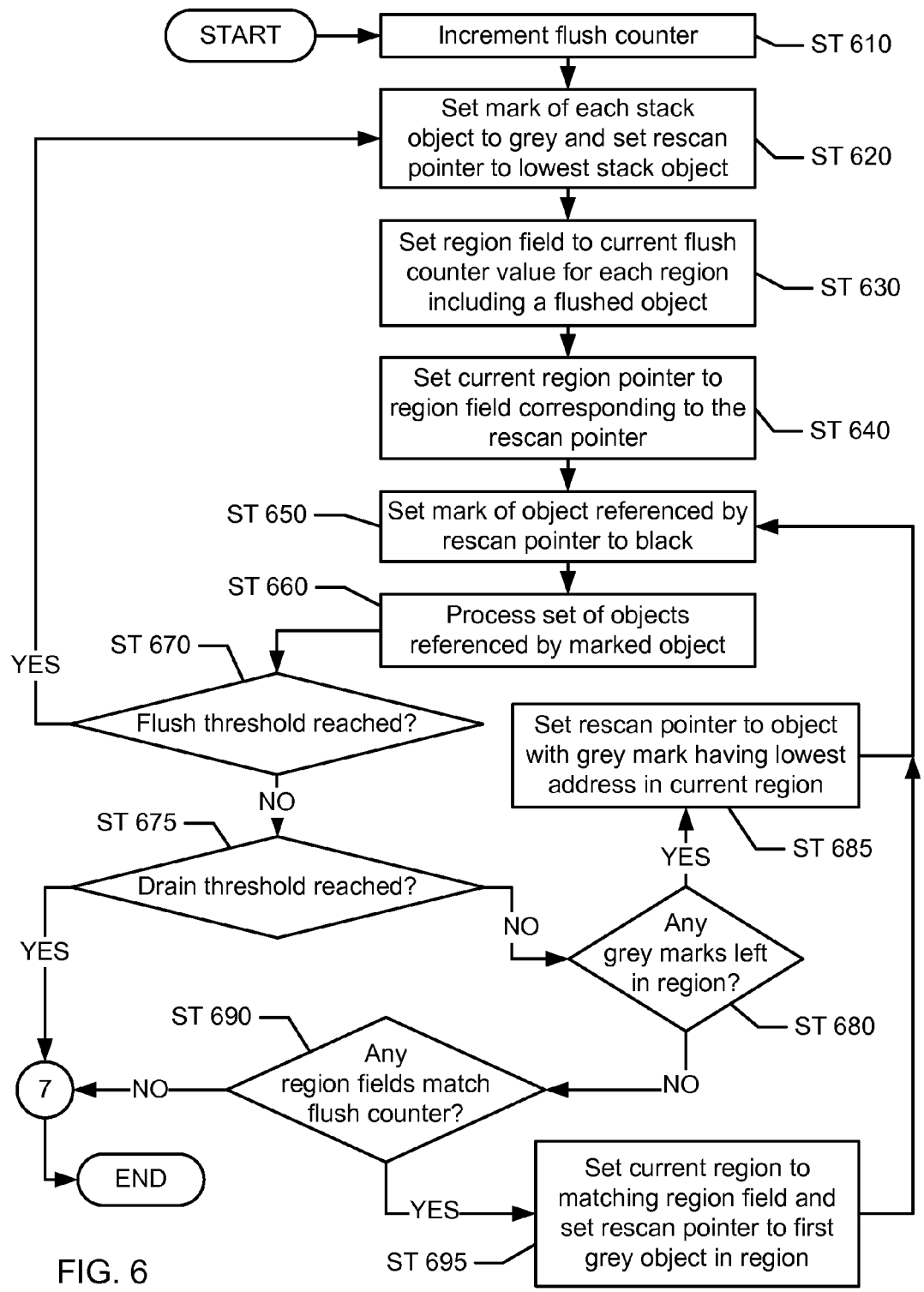
FIG. 6 shows a flow chart for flushing a mark stack, in accordance with one embodiment of the invention.

FIG. 5 shows a flow chart for processing data objects referenced by a selected data object, in accordance with one embodiment of the invention. In particular, FIG. 5 illustrates an exemplary expansion of the steps involved in performing ST 480 (shown in FIG. 4) after a particular data object has been selected (e.g., data object 10 (210) shown in FIG. 2).

At ST 510, a set of data objects marked white and referenced by the selected data object may be identified. For example, referring to FIG. 2, data object 7 (207), data object 8 (208), and data object 14 (214) may be identified as being referenced by data object 10 (210). At ST 520, a loop to process each data object in the set (identified at ST 510) may be entered.

At ST 530, a determination is made about whether the address of the current data object is lower than a finger position. If it is determined that the address of the current data object is lower than a finger position, then at ST 550, an identifier for the current data object may be added to a mark stack. For example, referring to FIG. 3B, it may be determined that the address of data object 7 (207) is lower than the position of finger (350). Thus, an identifier "7" may be added to the mark stack (310). After ST 550, the processing of the current data object is complete, and the flowchart returns to ST 520 to begin processing another data object.

However, if it is determined at ST 530 that the address of the current data object is not lower than a finger position, then at ST 540, a mark for the current data object may be set to grey. For example, referring to FIG. 3B, it may be determined that the address of data object 14 (214) is higher than the position of finger (350). Thus, the mark (305) labeled "14" may be set to grey. At ST 543, a determination is made about whether the object address is greater than the maximum pointer (e.g., maximum pointer (340) shown in FIG. 3B). If so, then at ST 546, the maximum pointer is updated with the object address. After ST 546, or if it is determined at ST 543 that the object address is not greater than the maximum pointer, then the processing of the current data object is complete, and the flowchart returns to ST 520 to begin processing another data object. Once all data objects have been processed, the process terminates.

FIG. 6 shows a flow chart for flushing a mark stack, in accordance with one embodiment of the invention. Note that FIG. 6 represents a continuation of the flowchart shown in FIG. 4, after either ST 490 or ST 499. Specifically, the process shown in FIG. 6 may occur after determining at ST 490 that a flush threshold has been reached. In other words, the number of identifiers in the mark stack has reached a predefined level configured to trigger a flush of the mark stack. For example, referring to FIG. 3F, the number of identifiers in mark stack (310) has reached flush threshold (312). In one embodiment, a flush threshold may be set to indicate that a mark stack has overflowed (i.e., the mark stack has received more identifiers than it can hold), or is close to overflowing. Further, the process shown in FIG. 6 may also occur after determining at ST 499 that the mark stack is not empty.

At ST 610, a flush counter may be incremented. For example, referring to FIG. 3G, the flush counter (330) is incremented to the value "1." In one or more embodiments, the value of the flush counter may indicate a number of times that the mark stack has been flushed during normal scanning of the mark bitmap. At ST 620, a mark corresponding to each identifier in the mark stack may be set to grey. For example, referring to FIG. 3G, the mark (305) corresponding to the identifiers in mark stack (310) (i.e., identifiers "2," "3," "4," "5," and "8") may be set to grey. Further, a rescan pointer is set to the mark of the object with the lowest address among the data objects whose identifier is in the mark stack. For example, referring to FIG. 3H, the rescan pointer (360) is set to the mark "2" of the mark bitmaps (300).

At ST 630, each region field which corresponds to a region which includes a mark for a flushed data object may be set to the value of the flush counter. For example, referring to FIG. 3H, regions $R_1$ and $R_2$ of the mark bitmap (300) include marks (305) corresponding to the identifiers removed from the mark stack (310). Accordingly, the region fields (325) corresponding to regions $R_1$ and $R_2$ may be set to the flush counter value "1," thus indicating that these regions include data objects flushed during the flush operation corresponding to the flush counter value "1."

At ST 640, the region comprising the object pointed by the rescan pointer is recorded in a current region pointer. In other word, the current region pointer is set to the starting address of the first region (i.e., region with lowest addresses) which corresponds to a region field matching the current value of the flush counter. For example, referring to FIG. 3H, the first region field (325) which matches the current value of the flush counter (330) (i.e., value "1") is the region field (325) corresponding to region $R_1$.

At ST 650, the mark of the object referenced by the rescan pointer it set to black. Next, at ST 660, the references of the object pointed to by the rescan pointer are processed. That is, each referenced data object is either set to grey or added to a mark stack, depending on the location of the referenced data object relative to the current finger (i.e., finger (350) shown in FIG. 3H). In one or more embodiments, ST 660 may be performed using the process described above with reference to FIG. 5 (i.e., steps ST 51-ST 550).

At ST 670, a determination is made about whether the flush threshold of the mark stack has been reached. If so, the rescan process returns to ST 620 to restart the rescan process. Note that in contrast to a rescan initiated from a normal scan of the mark bitmaps, the flush counter is not incremented. However, if it is determined at ST 670 that the flush threshold has not been reached, the rescan process continues to ST 675, where a determination is made about whether a drain threshold has been reached. If the drain threshold has been reached, the rescan process continues on the flowchart shown in FIG. 7. After the completing the flowchart shown in FIG. 7, the process terminates. Otherwise, if it is determined at ST 675 that the drain threshold has not been reached, the rescan process continues to ST 680.

At ST 680, a determination is made about whether there are any grey marks left in the current region. If so, then at ST 685, the rescan pointer is set to the object having a grey mark that has the lowest address in the current region, and the rescan process returns to ST 650. However, if it is determined at ST 680 that there are no more grey marks left in the current region, then at ST 690, a determination is made whether a region field of the rescan map matches the current value of the flush counter. If not (i.e., there are no grey marks left in the mark bitmap), the rescan process continues on the flowchart shown in FIG. 7 to drain the remaining identifiers in the mark stack. After the completing the flowchart shown in FIG. 7, the process terminates.

However, if it is determined at ST 690 that another region field matches the current value of the flush counter, then at ST 695, the current region pointer is set to the region corresponding to the region field matching the current value of the flush counter, and the rescan pointer is set the first grey object of the region (i.e., the data object in the region having the lowest address and a mark set to grey). The rescan process then returns to ST 650.

FIG. 7 shows a flow chart for draining a mark stack, in accordance with one embodiment of the invention. In particular, FIG. 7 may represent a continuation of the flowchart shown in FIG. 4, after determining at ST 493 that a drain threshold has been reached. In other words, the number of identifiers in the mark stack has reached a predefined level configured to trigger a drain of the mark stack. For example, referring to FIG. 3C, the number of identifiers in mark stack (310) has reached drain threshold (314). In one embodiment, a drain threshold may be set so as to maintain a desired number of identifiers in the mark stack. Further, FIG. 7 may represent a continuation of the flowchart shown in FIG. 6, after either ST 675 or ST 690.

At ST 710, a loop to process each data object in the mark stack may be entered. At ST 720, a current data object may be removed from the mark stack. For example, referring to FIG. 3E, the identifier "7" may be removed from the mark stack (310).

At ST 740, the mark corresponding to the current data object may be set to black. For example, referring to FIG. 3F, the mark "7," corresponding to data object 7 (207), may be set to black. At ST 750, one or more data objects referenced by the current data object may be processed. That is, each data object referenced by the current data object may be either set to grey or added to a mark stack, depending on the location of the referenced data object relative to the finger. In one or more embodiments, ST 750 may be performed using the process described above with reference to FIG. 5 (i.e., steps ST 510-ST 550).

At ST 760, a determination is made about whether a flush threshold (e.g., flush threshold (312) shown in FIG. 3F) is reached. If it is determined that the flush threshold has been reached, then the process continues on the flowchart shown in FIG. 6. After completing the flowchart shown in FIG. 6, or if it has been determined at ST 760 that the flush threshold has not been reached, the processing of the current data object is complete, and the process returns to ST 710 to begin processing another data object. Once all data objects have been processed, the process for draining a mark stack terminates.

In general, embodiments of the invention provide a method and system for garbage collection. As described above, in one or more embodiments, a mark bitmap may explicitly mark each data object as white, black, or grey. In addition, a mark stack may enable tracking of backward references encountered during garbage collection. The use of the mark bitmap and mark stack may enable maintenance of the status of data objects, thereby reducing the amount of rescanning required after a stack overflow. Further, the use of a rescan map may enable efficient determination of regions of the mark bitmap which do not require rescanning, thereby also reducing the amount of rescanning required after a stack overflow. Additionally, the use of a flush counter may eliminate the need to clear the rescan map, thereby reducing bus access and memory access. Further, embodiments of the invention may enable use of less memory for garbage collection than that required by garbage collection techniques of the prior art.

Figure 8:
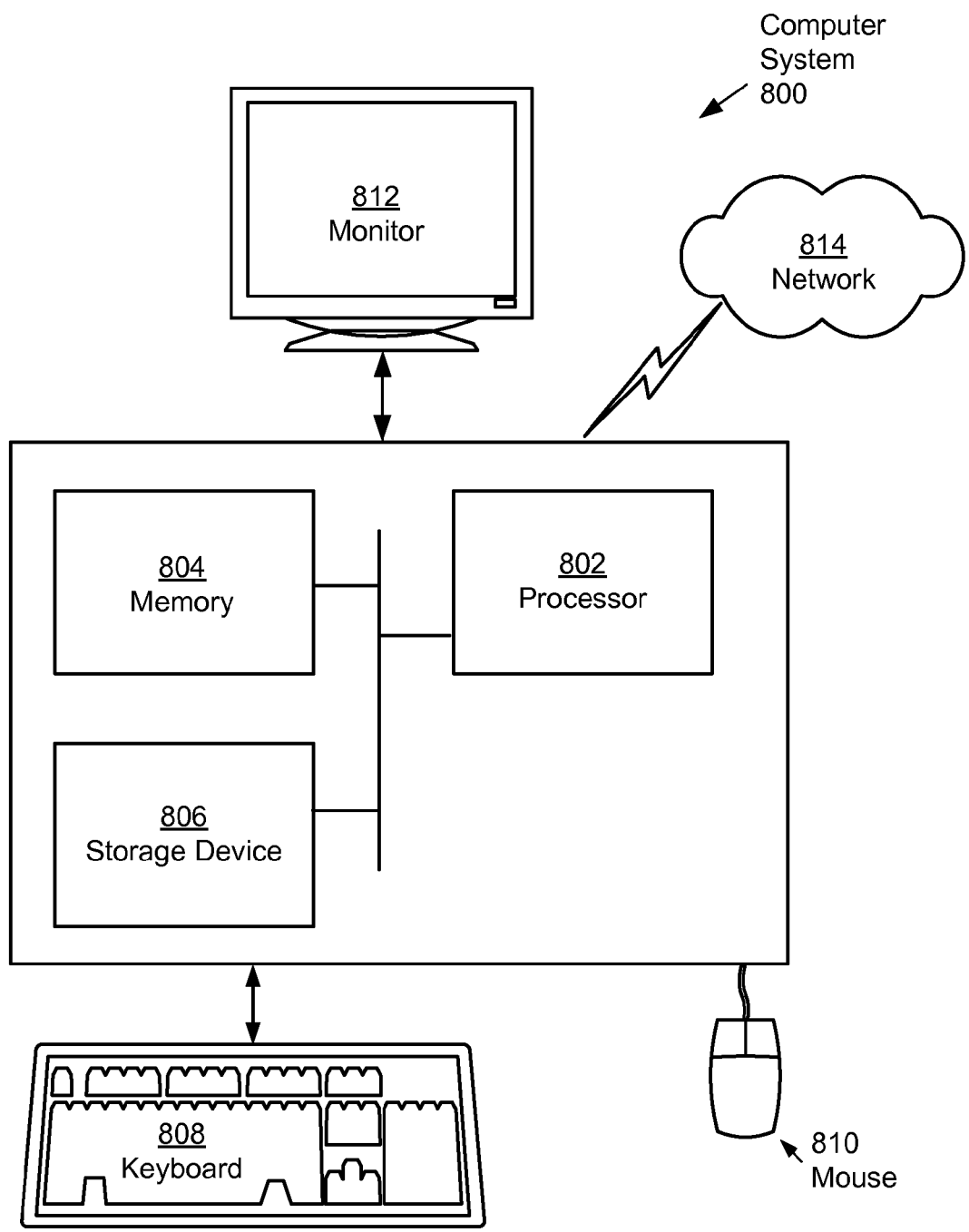
FIG. 8 shows a diagram of a computer system in accordance with one or more embodiments of the invention.

Embodiments of the invention may be implemented on virtually any type of computer regardless of the platform being used. For example, as shown in FIG. 8, a networked computer system (800) includes a processor (802), such as a central processing unit (CPU) or other hardware component capable of processing instructions, associated memory (804), a storage device (806), and numerous other elements and functionalities typical of today's computers (not shown). The networked computer (800) may also include input means, such as a keyboard (808) and a mouse (810), and output means, such as a monitor (812). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be remotely located and connected to the other elements over a network. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A non-transitory computer readable storage medium comprising a plurality of instructions for garbage collection, the plurality of instructions comprising functionality to:
create a mark bitmap comprising a plurality of marks, wherein each of the plurality of marks corresponds to a memory location of a heap memory;

create a rescan map comprising a plurality of region fields, wherein each of the plurality of region fields corresponds to a fixed-size contiguous region of the mark bitmap;
identify a first data object referenced by a second data object, wherein the first data object and the second data object are included in a plurality of data objects residing in the heap memory;
determine that an address of the first data object is lower than a pointer position, wherein the pointer position is an address of the second data object;
add, in response to determining that the address of the first data object is lower than the pointer position, an identifier for the first data object to a mark stack;
determine that a number of identifiers in the mark stack has reached a predefined flush threshold, wherein each identifier in the mark stack is associated with a different one of the plurality of data objects;
in response to determining that the number of identifiers in the mark stack has reached the predefined flush threshold:
increment a flush counter;
set a subset of the plurality of marks included in the mark bitmap to grey, wherein each of the subset of the plurality of marks is associated with a unique identifier in the mark stack;
set, in the rescan map, at least one region field of the plurality of region fields to a value of the flush counter to indicate that at least one fixed-size contiguous region of the mark bitmap includes any of the plurality of marks;
identify, in the plurality of region fields of the rescan map, a set of region fields having the value of the flush counter;
perform a rescan of a portion of the heap memory corresponding to the set of region fields; identify, based on the rescan, at least one unreachable data object of the plurality of data objects; and
free, in the portion of the heap memory, at least one memory segment corresponding to the unreachable data object.

2. The non-transitory computer readable storage medium of claim 1, wherein the plurality of instructions further comprise functionality to:
clear the mark stack in response to determining that the number of identifiers in the mark stack has reached the predefined flush threshold.

3. The non-transitory computer readable storage medium of claim 1, wherein performing the rescan of the portion of the heap memory comprises setting a rescan pointer to a mark of the plurality of marks having a lowest address within the corresponding fixed-size contiguous region of the mark bitmap.

4. The non-transitory computer readable storage medium of claim 1, wherein each of the plurality of marks comprises two binary digits.

5. The non-transitory computer readable storage medium of claim 4, wherein each of the plurality of marks indicates a mark color associated with an associated data object of the plurality of data objects, and wherein the mark color is one selected from a group consisting of white, black, and grey.

6. The non-transitory computer readable storage medium of claim 5, wherein the plurality of instructions further comprise functionality to:
determine that the mark stack is empty and that no marks in the mark bitmap are set to grey; and
perform, in response to determining that the mark stack is empty and that no marks in the mark bitmap are set to grey, a garbage collection of all data objects having marks set to white.

7. The non-transitory computer readable storage medium of claim 1, wherein the plurality of instructions further comprise functionality to:
determine that a different number of identifiers in the mark stack has reached a predefined drain threshold;
in response to determining that the different number of identifiers in the mark stack has reached the predefined drain threshold:
remove a first identifier from the mark stack;
set the pointer position to a location of a third data object, wherein the third data object is associated with the first identifier;
set a mark associated with the third data object to black; and
identify a fourth data object referenced by the third data object, wherein the third data object and the fourth data object are included in the plurality of data objects.

8. The non-transitory computer readable storage medium of claim 7, wherein the plurality of instructions further comprise functionality to:
determine whether the address of the fourth data object is lower than the pointer position; and
add, in response to determining that the address of the fourth data object is lower than the pointer position, an identifier for the fourth data object to the mark stack.

9. The non-transitory computer readable storage medium of claim 1, wherein the value of the flush counter indicates a number of flushes of the mark stack.

10. The non-transitory computer readable storage medium of claim 1, wherein the plurality of instructions further comprise functionality to:
clear the value of the flush counter from the set of region fields after performing the rescan of the portion of the heap memory.

11. A system for garbage collection, comprising:
a computer processor;
a physical memory; and
a garbage collector executing on the computer processor and configured to:
create a mark bitmap comprising a plurality of marks, wherein each of the plurality of marks corresponds to a memory location of a heap memory;
create a rescan map comprising a plurality of region fields, wherein each of the plurality of region fields corresponds to a fixed-size contiguous region of the mark bitmap;
identify a first data object referenced by a second data object, wherein the first data object and the second data object are included in a plurality of data objects residing in the heap memory;
determine that an address of the first data object is lower than a pointer position, wherein the pointer position is an address of the second data object;
add, in response to determining that the address of the first data object is lower than the pointer position, an identifier for the first data object to a mark stack;
determine that a number of identifiers in the mark stack has reached a predefined flush threshold, wherein each identifier in the mark stack is associated with a different one of the plurality of data objects;

in response to determining that the number of identifiers in the mark stack has reached the predefined flush threshold:
  increment a flush counter;
  set a subset of the plurality of marks included in the mark bitmap to grey, wherein each of the subset of the plurality of marks is associated with a unique identifier in the mark stack;
  set, in the rescan map, at least one region field of the plurality of region fields to a value of the flush counter to indicate that at least one fixed-size contiguous region of the mark bitmap includes any of the plurality of marks;
  identify, in the plurality of region fields of the rescan map, a set of region fields having the value of the flush counter;
  perform a rescan of a portion of the heap memory corresponding to the set of region fields;
  identify, based on the rescan, at least one unreachable data object of the plurality of data objects; and
  free, in the portion of the heap memory, at least one memory segment corresponding to the unreachable data object.

12. The system of claim 11, wherein the garbage collector is further configured to:
  clear the mark stack in response to determining that the number of identifiers in the mark stack has reached the predefined flush threshold.

13. The system of claim 11, wherein performing the rescan of the portion of the heap memory comprises setting a rescan pointer to a mark of the plurality of marks having a lowest address within the corresponding fixed-size contiguous region of the mark bitmap.

14. The system of claim 11, wherein the value of the flush counter indicates a number of flushes of the mark stack.

15. A method for garbage collection, comprising:
  creating, by a computer processor, a mark bitmap comprising a plurality of marks, wherein each of the plurality of marks corresponds to a memory location of a heap memory;
  creating, by the computer processor, a rescan map comprising a plurality of region fields, wherein each of the plurality of region fields corresponds to a fixed-size contiguous region of the mark bitmap;
  identifying a first data object referenced by a second data object, wherein the first data object and the second data object are included in a plurality of data objects residing in the heap memory;
  determining, by the computer processor, that an address of the first data object is lower than a pointer position, wherein the pointer position is an address of the second data object;
  adding, in response to determining that the address of the first data object is lower than the pointer position, an identifier for the first data object to a mark stack;
  determining, by the computer processor, that a number of identifiers included in a mark stack has reached a predefined flush threshold, wherein each identifier in the mark stack is associated with a different one of the plurality of data objects;
  in response to determining that the number of identifiers included in the mark stack has reached the predefined flush threshold:
    incrementing a flush counter;
    setting a plurality of marks included in the mark bitmap to grey, wherein each of the plurality of marks is associated with a different one of the plurality of data objects;
    setting, in the rescan map, at least one region field of the plurality of region fields to a value of the flush counter to indicate that at least one fixed-size contiguous region of the mark bitmap includes any of the plurality of marks;
    identify, in the plurality of region fields of the rescan map, a set of region fields having the value of the flush counter;
    performing a rescan of a portion of the heap memory corresponding to the set of region fields;
    identifying, based on the rescan, at least one unreachable data object of the plurality of data objects; and
    freeing, in the portion of the heap memory, at least one memory segment corresponding to the unreachable data object.

16. The method of claim 15, further comprising:
  clearing the mark stack in response to receiving the indication that the number of identifiers included in the mark stack has reached the predefined flush threshold.

17. The method of claim 15, wherein performing the rescan of the portion of the heap memory comprises setting a rescan pointer to a mark of the plurality of marks having a lowest address within the corresponding fixed-size contiguous region of the mark bitmap.

18. The method of claim 15, wherein the value of the flush counter indicates a number of flushes of the mark stack.

* * * * *